(12) United States Patent
Panaitopol

(10) Patent No.: US 10,206,128 B2
(45) Date of Patent: Feb. 12, 2019

(54) COMMUNICATION SYSTEM, APPARATUS AND RELATED METHODS OF OPERATION

(71) Applicant: NEC Corporation, Tokyo (JP)

(72) Inventor: Dorin Panaitopol, Berhshire (GB)

(73) Assignee: NEC Corporation, Tokyo (JP)

(*) Notice: Subject to any disclaimer, the term of this patent is extended or adjusted under 35 U.S.C. 154(b) by 0 days.

(21) Appl. No.: 14/425,900

(22) PCT Filed: Aug. 5, 2014

(86) PCT No.: PCT/JP2014/071348
§ 371 (c)(1),
(2) Date: Mar. 4, 2015

(87) PCT Pub. No.: WO2015/020231
PCT Pub. Date: Feb. 12, 2015

(65) Prior Publication Data
US 2016/0150426 A1    May 26, 2016

(30) Foreign Application Priority Data

Aug. 6, 2013 (GB) .................................. 1314080.1

(51) Int. Cl.
*H04W 24/08* (2009.01)
*H04W 24/10* (2009.01)
(Continued)

(52) U.S. Cl.
CPC ........... *H04W 24/08* (2013.01); *H04L 67/104* (2013.01); *H04W 24/10* (2013.01); *H04W 92/18* (2013.01)

(58) Field of Classification Search
CPC ... H04W 76/023; H04W 4/005; H04W 92/18; H04L 67/104
See application file for complete search history.

(56) References Cited

U.S. PATENT DOCUMENTS

2011/0275382 A1* 11/2011 Hakola ................. H04W 24/10
455/452.2
2012/0243431 A1   9/2012 Chen et al.
(Continued)

FOREIGN PATENT DOCUMENTS

EP        2552034 A2   1/2013
TW     201220796 A    5/2012
(Continued)

OTHER PUBLICATIONS

Author Unknown, UE Measurement Concept for Intra-Frequency Measurements, TSG-RAN Working Group 2, May 20, 1999, pp. 1-11.*

(Continued)

*Primary Examiner* — Christopher M Crutchfield
(74) *Attorney, Agent, or Firm* — Wilmer Cutler Pickering Hale and Dorr LLP

(57) ABSTRACT

A communication network system and related devices and method of monitoring in a mobile radio communications network environment direct communications between first and second mobile communication devices to provide to the network an indication of link-quality of the direct communication, wherein the network is arranged to configure at least one of the mobile radio communication devices with a link-quality parameter reference value, the said at least one mobile radio communications device can report to the network if it determines, relative to the said reference value, that the link-quality of the direct communication is insufficient, and if required the network can subsequently control communication between the said first and second mobile radio communication devices responsive to the reporting the received from the said at least one mobile radio communications device, or the network can employ the reporting (Continued)

from the said at least one mobile radio communications device for network planning/optimization purposes.

19 Claims, 24 Drawing Sheets

(51) Int. Cl.
  *H04W 92/18* (2009.01)
  *H04W 84/00* (2009.01)
  *H04L 29/08* (2006.01)

(56) References Cited

U.S. PATENT DOCUMENTS

| | | | |
|---|---|---|---|
| 2013/0028120 A1 | 1/2013 | Sun et al. | |
| 2014/0018010 A1 | 1/2014 | Gao et al. | |
| 2014/0094162 A1* | 4/2014 | Heo | H04W 52/0258 455/422.1 |
| 2014/0219095 A1* | 8/2014 | Lim | H04W 72/085 370/235 |
| 2015/0327018 A1* | 11/2015 | Rehnberg | H04W 64/00 370/252 |
| 2017/0141868 A1* | 5/2017 | Morita | H04J 11/0056 |

FOREIGN PATENT DOCUMENTS

| | | |
|---|---|---|
| WO | WO-2011/069295 A1 | 6/2011 |
| WO | WO-2011/138495 A1 | 11/2011 |
| WO | WO-2012/129806 A1 | 10/2012 |
| WO | WO-2013/016682 A1 | 1/2013 |

OTHER PUBLICATIONS

Author Unknown, 3GPP TS 36.331, 3rd Generation Partnership Project, Technical Specification Group Radio Access Network, Evolved Universal Terrestrial Radio Access (E-UTRA), Radio Resource Control (RRC), Protocol specification (Release 11), pp. 1-346, Jun. 2013.*
3GPP TSG RAN WG1 Meeting #72, R1-130794, Summary of Device to Device Proximity Service Session (Jan. 28, 2013) (2 pages).
3GPP TSG RAN Meeting #58, RP-122009, Study on LTE Device to Device Proximity Services (Dec. 7, 2012) (6 pages).
TCCA SP-120456 (Jul. 27, 2012) Additional Information: Group Communications & Proximity-based Services (2 pages).
3GPP TSG-SA WG Meeting #58, S1-121247, Information about the system improvements requirements for the adoption of LTE for mission/business critical communications (May 7, 2012) (2 pages).
3GPP TSG-RAN WG1 Meeting #72, R1-130133, Evaluation methodology for D2D discovery (Jan. 28, 2013) (4 pages).
3GPP TSG RAN WG1 #72, R1-130377, Evaluation Methodology for Proximity Services (Jan. 28, 2013) (13 pages).
GB Search Report issued in the priority application No. 1314080.1, dated Jan. 23, 2014 (5 pages).
International Search Report corresponding to PCT/JP2014/071348 dated Jan. 16, 2015 (4 pages).
PCT ISA 237 Written Opinion of the International Searching Authority corresponding to PCT/JP2014/071348 dated Jan. 16, 2015 (6 pages).

* cited by examiner

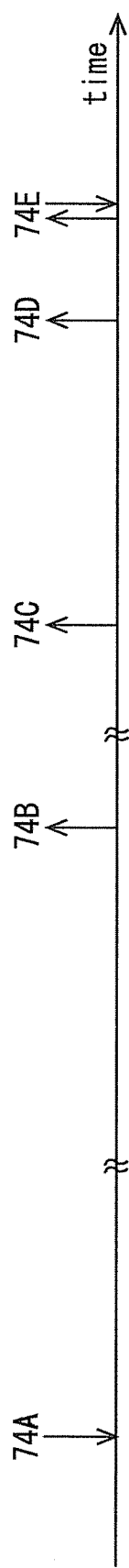

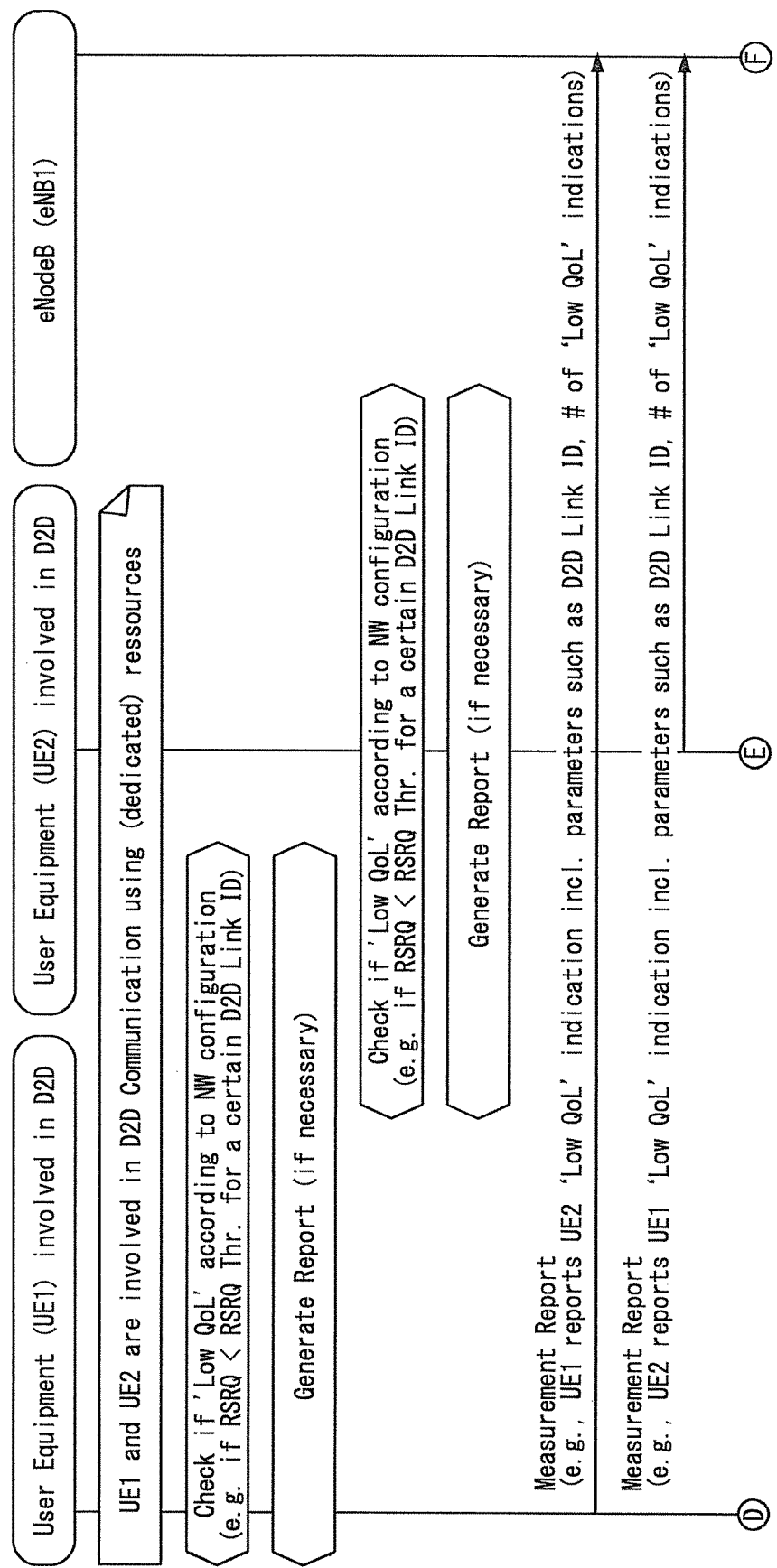

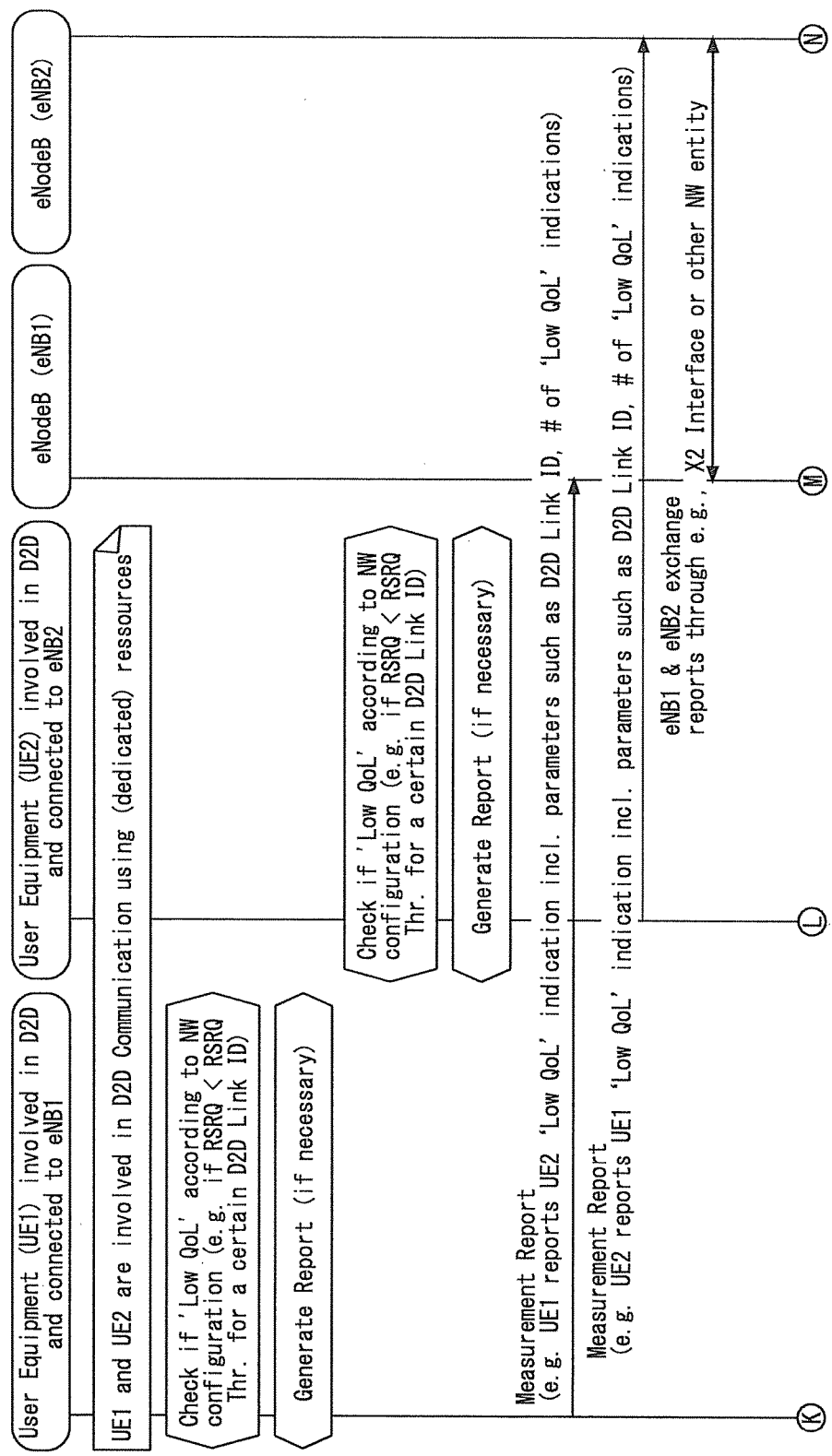

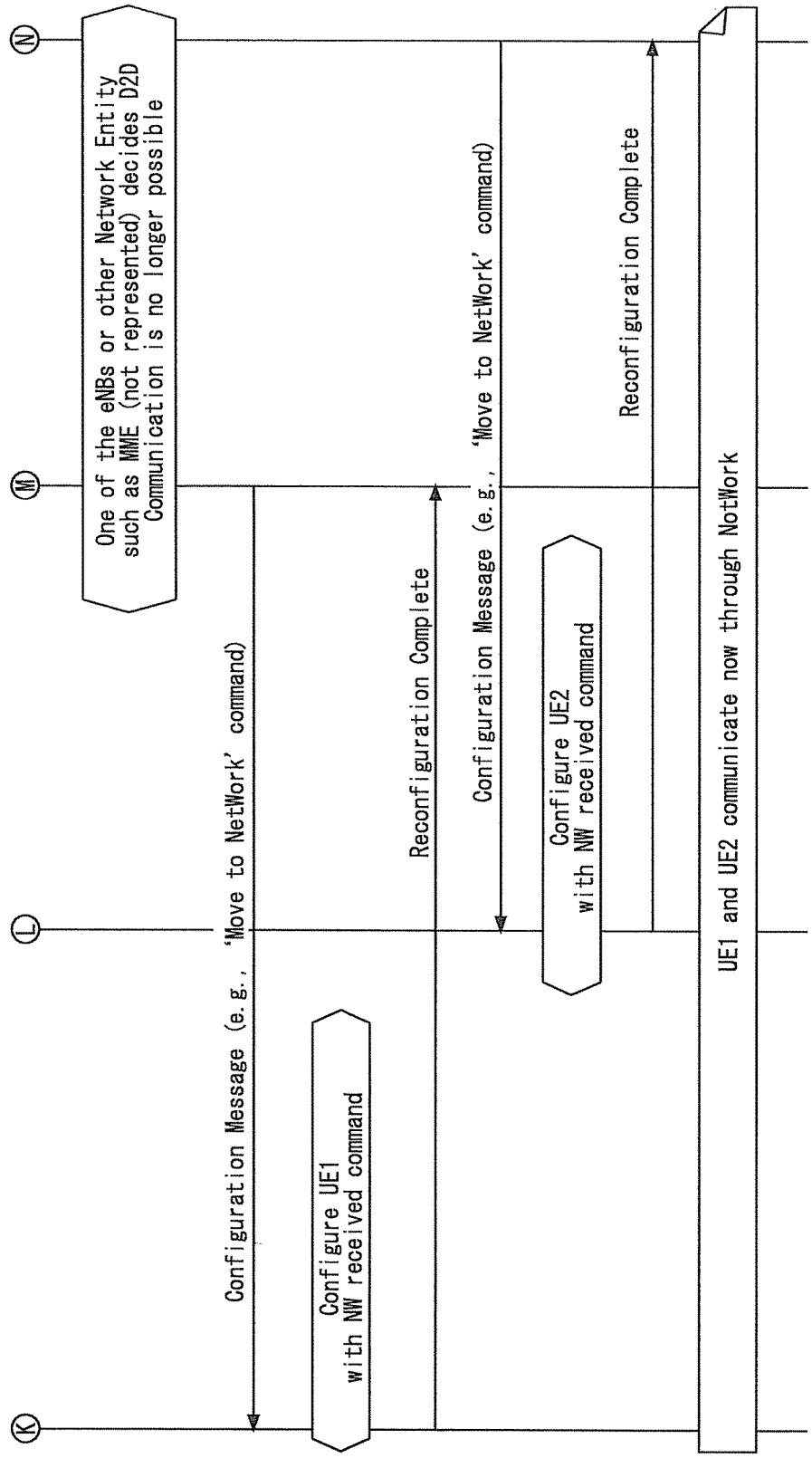

COMMUNICATION SYSTEM, APPARATUS AND RELATED METHODS OF OPERATION

CROSS-REFERENCE TO RELATED APPLICATIONS

This application is a national stage application of International Application No. PCT/JP2014/071348 entitled "Communication System, Apparatus and Related Methods of Operation," filed on Aug. 5, 2014 which claims the benefit of the priority of British Patent Application No. GB 1314080.1, filed on Aug. 6, 2013, the disclosures of each of which are hereby incorporated by reference in their entirety.

TECHNICAL FIELD

The present invention relates to a communication system comprising a mobile communications network and in particular to communication between mobile radio communication devices operating within such network environment and having the capability for direct communication.

BACKGROUND ART

In particular, but not exclusively, the invention is related to Device to Device (D2D) and User Equipment Relay (UER) technology operating under Network (NW) control. As will of course be appreciated for D2D scenarios, a D2D UE communicates with another D2D UE while, for UER scenarios, a UE is relayed (to/from the NW) by another UE with relaying function (UER).

In a network environment, two mobile radio communications devices, such as User Equipments (UEs) can be involved in intra-cell or inter-cell D2D communication (or UE to/from UER communication scenarios) and communicating under NetWork (NW) control. Scenarios also arise where only one of the devices is under NW control, and the other is "out-of-coverage", or indeed one of the devices can be "under coverage" but out of network control. It is appreciated that the environment within which the devices are located evolves all the time, such as due to changes in position, interference from other cells or other users, power, and distance between the D2D devices. Therefore, it can be beneficial for the NW to know when e.g. a change in the D2D communication might be desirable such that the UEs might look to send information to the NW related to their quality of D2D connection state.

The monitoring of link-quality between two D2D devices is known from a variety of prior art documents such as, for example, PTL1. This document discloses a method for facilitating D2D communication in which a variety of signals are sent between the network and the D2D devices so as to trigger one device to transmit a reference signal, and to request a second device to provide a channel quality indication on the basis of the received reference signal which serves as determining, and reporting, D2D channel quality.

However, the volume of signalling arising in relation to such known arrangements, and their general efficiency of operation, is disadvantageously limiting and leads to undesired transmission overheads and inefficient determination and signalling relating to link-quality. The measurements are taken prior to communication and so are based on legacy pilot transmissions (Sounding Reference Signals SRS) and the measurements are used to determine if D2D communication should take place or not.

Also, from various 3GPP discussion documents, proximity based applications and services have been identified of interest for 3GPP work. This has therefore initiated new Work Items (WIs) and the first step is to investigate the features (or Study Items). However there is little definition of network control of any possible direct communication between the UEs, nor has there been any discussion of the gathering and use of link-quality information.

For example, at the December 2012 RAN plenary meeting, it was agreed to start a Study Item (SI) focussing on LTE device-to-device (D2D) proximity services. The RAN guidance was also to focus on evaluation methodology and channel model only in RAN1#72.

Proximity Services (ProSe) were previously investigated as a SI with SA1, and their conclusions on use cases were summarized in TR 22.803.

During 3GPP TSG RAN WG1 Meeting #72 a Summary of Device to Device Proximity Service Session NPL1, and Draft notes for Study on LTE Device to Device Proximity Services was noted. The study started with respect to a document from a previous meeting (3GPP TSG RAN Meeting #58): NPL2.

Also, an extract from NPL2 (Huawei, HiSilicon—"Evaluation requirements for D2D") notes that: "The Feasibility Study on Proximity-based Services (FS_ProSe, TR 22.803) has identified valuable services that could be provided by the 3GPP system based on UEs being in proximity to each other. The identified areas include Public Safety and non-Public-Safety services that would be of interest to operators and users.

Proximity-based applications and services represent an emerging social-technological trend. The introduction of a Proximity Services (ProSe) capability in LTE would allow the 3GPP industry to serve this developing market, and will, at the same time, serve the urgent needs of several Public Safety communities that are jointly committed to LTE (see NPL3 and NPL4).

ProSe normative specification is also important to enable economy of scale advantages, i.e. that the resulting system can be used for both Public Safety and non-Public-Safety services, where possible."

Further from NPL5 it was noted that: "D2D ProSe could be realized within or without LTE network coverage, and in both cases the detection signals are used by UEs for D2D proximity direct discovery without position information. As shown in FIG. 1a/1b, UEs transmit beacon for announcing their existing and detect beacons for discovering proximal devices with or without network-assisted."

And from NPL6 it was noted that: "Device to device communications can either occur within network coverage or outside network coverage. The outside network coverage case is particularly important for several public safety use cases. In-network coverage device to device communications are possible in both commercial and public safety use cases."

CITATION LIST

Patent Literature

PTL 1: International Patent Publication No. WO2012/129806

Non Patent Literature

NPL 1: 3GPP TSG RAN WG1 Meeting #72, R1-130794: "Summary of Device to Device Proximity Service Session"

NPL 2: 3GPP TSG RAN Meeting #58, RP-122009: "Study on LTE Device to Device Proximity Services"

NPL 3: MoU between TETRA & Critical Communications Association (TCCA) & the National Public Safety Telecommunications Council, SP-120456: "Additional information: Group Communications & Proximity-based Services"

NPL 4: TETRA & Critical Communications Association (TCCA), 3GPP TSG-SA WG Meeting #58, S1-121247: "Information about the system improvements requirements for the adoption of LTE for mission/business critical communications"

NPL 5: ZTE, 3GPP TSG-RAN WG Meeting #72, 3GPPRAN1#72, R1-130133: "Evaluation methodology for D2D discovery" NPL 6: General Dynamics Broadband, 3GPP TSG RAN WG #72, R1-130377: "Evaluation methodology for Proximity Services"

SUMMARY OF INVENTION

Technical Problem

However, in all these prior art documents and discussions, the NW control is not defined to any particular suitable functional level of detail, particularly as regards to how the NW might control communication or gather relevant D2D Quality of Link information, and indeed what form the D2D link-quality information might take.

To summarise therefore, the known art does not define any effective method to control link-quality direct communication scenarios such as, but in no way limited to, D2D communication between UEs within a network environment, and there is no effective teaching concerning method steps to exchange information as appropriate with the network.

Solution to Problem

The present invention seeks to provide for a communication system operating within a mobile radio communications network environment, communication devices and related methods of operating, having advantages over known such systems, devices and methods.

In particular, the present invention seeks to provide for the determination of quality of a direct communication link (hereinafter D2D or UER "link-quality", "quality of link—QoL", or "quality of link indication") between mobile radio communication devices operating within a mobile network environment so as to facilitate subsequent control of communication between the devices with limited impact on signalling overhead within the network and with advantages signalling efficiencies.

According to one aspect of the present invention there is provided a method of monitoring in a mobile radio communications network environment direct communications between first and second mobile communication devices to provide to the network an indication of link-quality of the direct communication, the method including the steps of the network configuring at least one of the mobile radio communication devices with a link-quality parameter reference value, the said at least one mobile radio communications device reporting to the network if it determines, relative to the said reference value, that the link-quality of the direct communication is insufficient.

As a further feature, the network can control subsequent communication between the said first and second mobile radio communication devices responsive to the reporting received from the said at least one mobile radio communications device.

The invention proves advantageous insofar as improved network signalling efficiencies can be achieved. That is relatively infrequent configuring of the mobile radio communication devices is required, and signalling reports from the mobile radio communication devices are also required on a less frequent basis leading to advantageous reduction in transmission overheads within the network, while controlling various possible on-going communication scenarios for the two devices.

Also, and as distinguished from the current art, the monitoring can employ a D2D interface, and the actual D2D communication, and only an indication of low link-quality, rather than an actual value is sent.

It should be appreciated that the said reporting from the at least one device to the network represents advantageously simplified signalling providing an indication of QoL since not all QoL statistics need be sent. Rather, only an indication of how good or bad the QoL is (relative to the reference value) need be sent, and then, if desired as discussed further below, only once triggering conditions have been met.

Also, the sufficiency of the link-quality relative to the reference value can be determined as required as being either above or below the reference value, or equal to or above, or equal to or below, the reference value.

In a particularly efficient manner therefore, and responsive to the report(s) from the at least one device, the network can determine the state of the direct connection and initiate appropriate action.

Preferably, the method also includes the step of the network configuring the said at least one mobile radio communication device with at least one link identifier (ID) with a plurality of IDs being employed by a device when it is involved in a plurality of, for example, D2D links.

Also, since one mobile radio communications device may have multiple direct connection to other devices, whether D2D devices, UER devices, network nodes, RAN nodes, or otherwise (e.g. WiFi, Access Points or others using 3GPP or non-3GPP technology), an identifier per connection can prove important.

Further, the method can include the step of providing network control by way of a network command signal initiating a switch from direct communication between the devices to communication via the network.

As an alternative, the network control can comprise a command signal serving to retain the direct communication between the devices but with reallocated dedicated resources or resources better protected against interference.

In particular, the reallocated dedicated resources can comprise Resource Block (RB) or Resource Elements (RE) reallocation.

In one aspect of the invention, the report can be arranged to indicate the link-quality from a first to a second mobile radio communications device, and/or from the second to the first mobile radio communications device.

Further, the method can include the steps of providing the report from the at least one mobile radio communications device wholly with reference of the determined link-quality relative to the said reference value.

As an alternative, or in addition, the method can include the step of providing the report from the at least one mobile radio communications device on a periodic basis.

Further, the method can include the step of providing the report from the at least one mobile radio communication device on an event-based driven basis having regard, in particular, to a predetermined reference timing event.

In particular, the method can include the provision of a report from the said at least one mobile radio communications device by way of a trigger-based implementation. In this manner, a variable such as a "time to trigger" can be introduced.

In one example, of this implementation, the trigger can be initiated at a predetermined time and any determinations within the said at least one mobile radio communications device of the link-quality being insufficient to the reference value that have been made by that time, are delivered to the network.

As a second example, only indications of insufficient link-quality relative to the said reference value occurring after initiation of the trigger are reported to the network.

As a further feature, the method can include the step of the network determining the number of consecutive reports arising from the same low link-quality event. Of course, the said at least one mobile radio communications device can be simply arranged to send to the NW the number of QoL indications.

Further, the method can include the step of dynamically changing the reference value within the network, which dynamic change can represent an increase in the reference value or a decrease in the reference value as required, or indeed a completely new value not necessarily obtained from an incremental increase or decrease.

As will of course be appreciated, the method of the present invention can be provided in relation to D2D communication between first and second mobile radio communication devices operating within a network environment. Alternatively, the plurality of mobile radio communication devices can comprise any appropriate network terminal devices such as, for example, UE and UER devices.

Also, the configuration of the said at least one mobile radio communication device can be achieved on a static or dynamic basis as required and the said link-quality parameter reference value can comprise a threshold value.

The threshold value, which of course can be considered a D2D threshold value, can comprise, but is in no way limited to, a reference signal received quality RSRQ threshold, a block error rate BLER threshold, a bit error rate BER threshold, a packet error rate PER threshold, a frame error rate FER threshold, a signal to interference and noise ratio SINR threshold, a received signal code power RSCP threshold, a signal to noise ratio SNR threshold, an energy carrier to noise ratio Ec/NO threshold, a bit energy to noise ratio Eb/NO threshold, or a reference signal received power RSRP threshold.

Also, it should be appreciated that the said first and second mobile radio communication devices operating within the network environment can achieve connectivity representative of intra-cell communication, inter-cell communication or out-of-coverage communication in which only one of the mobile radio communication devices falls within network coverage or/and only one is under network control.

Further, the network control provided in response to a report from the said at least one mobile radio communications device can be provided for real time control of the communication.

As an alternative, to the above-mentioned network control, the network can employ the said reporting from the said at least one mobile radio communications device for network planning and/or optimisation, such as for example in relation to Minimization of Drive Test (MDT) purposes.

It should also be appreciated that an indication of low link-quality can also indicate, in the extreme, complete loss of connection.

The advantage of such (static or dynamic) configuration for D2D UE/UER is that less frequent configuration is required and the D2D UE/UER originating reports arise less often.

According to another aspect of the present invention there is provided a mobile data communications network comprising first and second mobile radio communication devices arranged for direct communication, the network being arranged to receive an indication of link-quality of the direct communication from at least one of the said mobile radio communication devices, wherein the network is arranged to configure at least one of the mobile radio communication devices with a link-quality parameter reference value, said at least one mobile radio communication device is arranged to report to the network if it is determined, relative to the said reference value, that the link-quality of the direct communication is insufficient, and such that the network can control subsequent communication between the first and second radio communication devices responsive to the report from the said at least one mobile radio communications device.

As with the above mentioned method, this aspect of the invention is advantageous in reducing the signalling overhead and providing for efficient monitoring control and, as required, adaptation of communication between directly communicating devices. In particular, the network of the system is also arranged to configure the at least one mobile radio communications device with one or more identifiers which can assist if the said at least one mobile radio communications device is involved in a variety of direct communications with a plurality of other devices.

It should of course be appreciated that the invention can provide for mobile radio communications network arranged to operate in accordance with one or more of the various method steps and procedures outlined above.

According to yet another aspect of the present invention there is provided a method in a first mobile radio communications device, operating in a mobile radio communications network environment, or assisting control of direct communication with a second mobile radio communications device, to provide to the network an indication of link-quality of the direct communication, the method including the steps of receiving configuration data from the network and comprising a link-quality parameter reference value, reporting to network if it is determined relative to the reference value that the link-quality of the direct communication is insufficient. The method can further include the receipt of control signalling from the network controlling subsequent communication between the first and second mobile radio communication devices.

Advantageously, the above mentioned method can further comprise indicating if the link between the first mobile radio communication device and second mobile radio communication device and/or second mobile radio communication device and first mobile radio communication device is insufficient with regard to the reference value.

Also, the method can be arranged to provide for a general implementation of an indication of link-quality, and responsive solely to determination of insufficient link-quality with reference to the said reference value.

Alternatively, the method can provide for periodic implementation of link-quality insufficiency, and comprising periodic indication of determination of insufficient link-quality with reference to the said reference value.

Yet further, the invention can provide for an event-based implementation of reporting to the network device, and responsive to determination of the existence of timed events derived from determination of insufficient link-quality with reference to the said reference value.

Preferably, the event-based implementation can comprise a trigger-based implementation responsive to specific time to trigger requirements meeting a threshold condition.

In this manner, method can allow for a plurality of low link-quality indicators to arise with regard to a time period before a trigger-based implementation is initiated.

In particular, the plurality of low link-quality indicators can be provided at the time of trigger, or alternatively, only low link-quality indicators arising subsequent to the time of trigger are provided in the report to the network.

According to a further aspect of the present invention there is provided a mobile radio communication device arranged to operate in accordance with any one or more of the method steps outlined above.

In particular, the mobile radio communication device can comprise any one or more of a D2D, a UE or a UER device.

According to still a further aspect of the present invention, there is provided a method in a network device operating within a mobile radio communications network environment of assisting direct communication between first and second mobile radio communications devices reporting to the network an indication of link-quality of the direct communication, the method including configuring at least one of the mobile radio communication devices with a link-quality parameter reference value, and receiving a report from the said at least one of the mobile radio communication devices indicating that, relative to the reference value, the link-quality of the said direction communication is insufficient.

The method can further include the step of controlling subsequent communication between the first and second radio communication devices responsive to the report from the said at least one mobile radio communications device.

Advantageously, the method can include configuring the said at least one device with at least one link identifier.

Further, the method can include the step of providing a control signal to switch the communication between the first and second mobile radio communication devices to the network.

Alternatively the control signal can be arranged to initiate use of alternative resources within the said direct communication link such as, for example, the allocation of dedicated resources such as reallocated resource blocks or resource elements.

The method within the network device can further include the step of varying the reference value such as by way of an increase or decrease as required.

It should also be appreciated that the configuration provided by the network device of the at least one mobile radio communications device can be on static or dynamic basis.

It should further be appreciated that the invention can provide for a network device arranged to operate within a mobile radio communications network environment and arranged, in particular, to operate in accordance with any one or more of the method steps noted above.

It will be appreciated that the invention provides for a mobile radio communication system employing a mobile radio communication device and a network device as outlined above.

Advantageous Effects of Invention

As noted elsewhere in this application, the action to be initiated by the network can comprise continuance of the direct communication, but with re-allocated different resources, or a controlled movement/transfer of the on-going communication between the devices to the network.

Within all aspects of the present invention, it should be appreciated that in determining the sufficiency of the link-quality, it can be determined in a mobile radio communications device if a link-quality parameter value is less than, or equal to and less than, or greater than, or equal to or greater than, the said parameter reference value, and as appropriate having regard to the nature of the parameter concerned.

BRIEF DESCRIPTION OF DRAWINGS

The invention is described further hereinafter, by way of example only, with reference to the accompanying drawings in which:

FIG. 4 is a schematic timing diagram providing a general illustration of signalling arising according to an embodiment of the invention providing for command signalling from the network.

FIG. 6A is message sequence charts illustrating signalling arising for an embodiment of intra-cell D2D communication according to an embodiment of the present invention such as that of FIG. 1.

FIG. 8A comprises message sequence charts for inter-cell D2D communication according to an embodiment of the present invention such as that of FIG. 2.

FIG. 8B comprises message sequence charts for inter-cell D2D communication according to an embodiment of the present invention such as that of FIG. 2.

DESCRIPTION OF EMBODIMENTS

Figure 1:
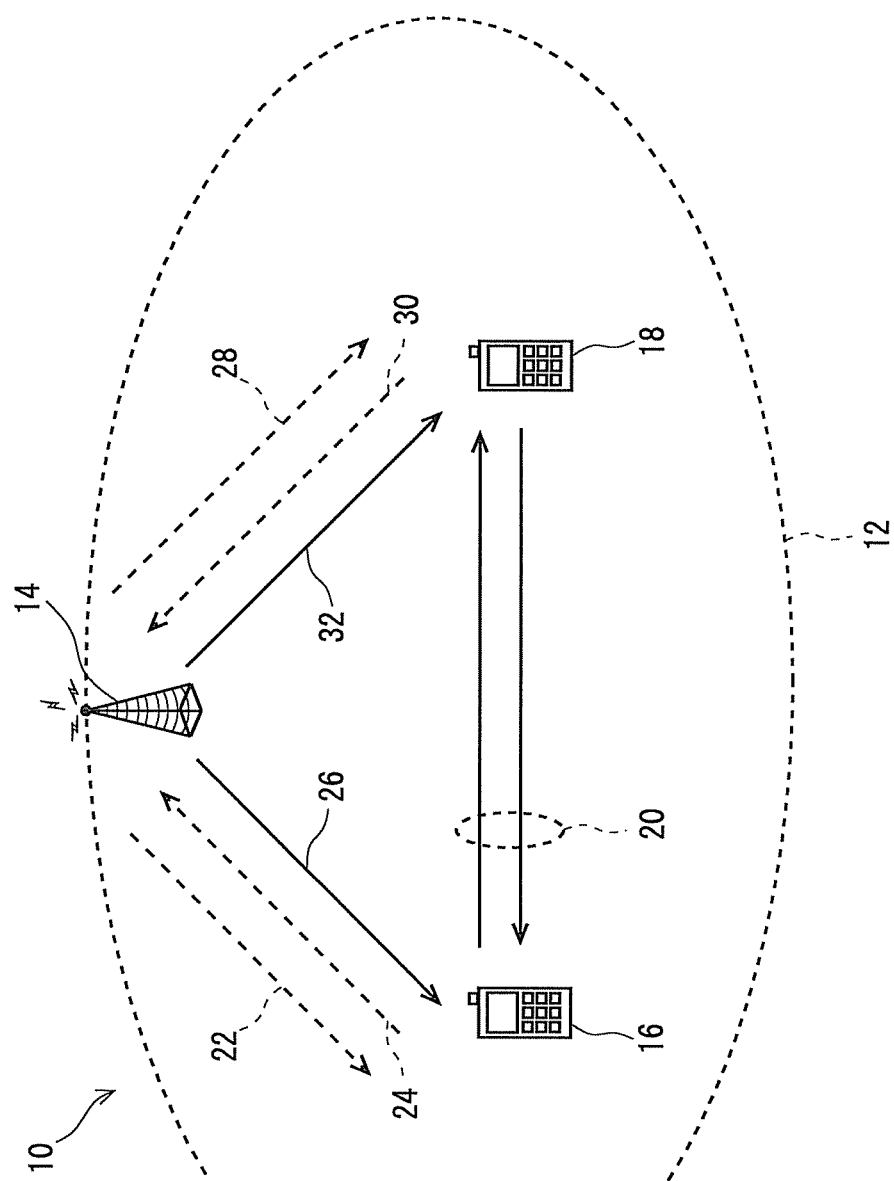
FIG. 1 is a schematic representation of intra-cell communications between a pair of mobile radio communication devices according to the embodiment of the present invention.
Figure 2:
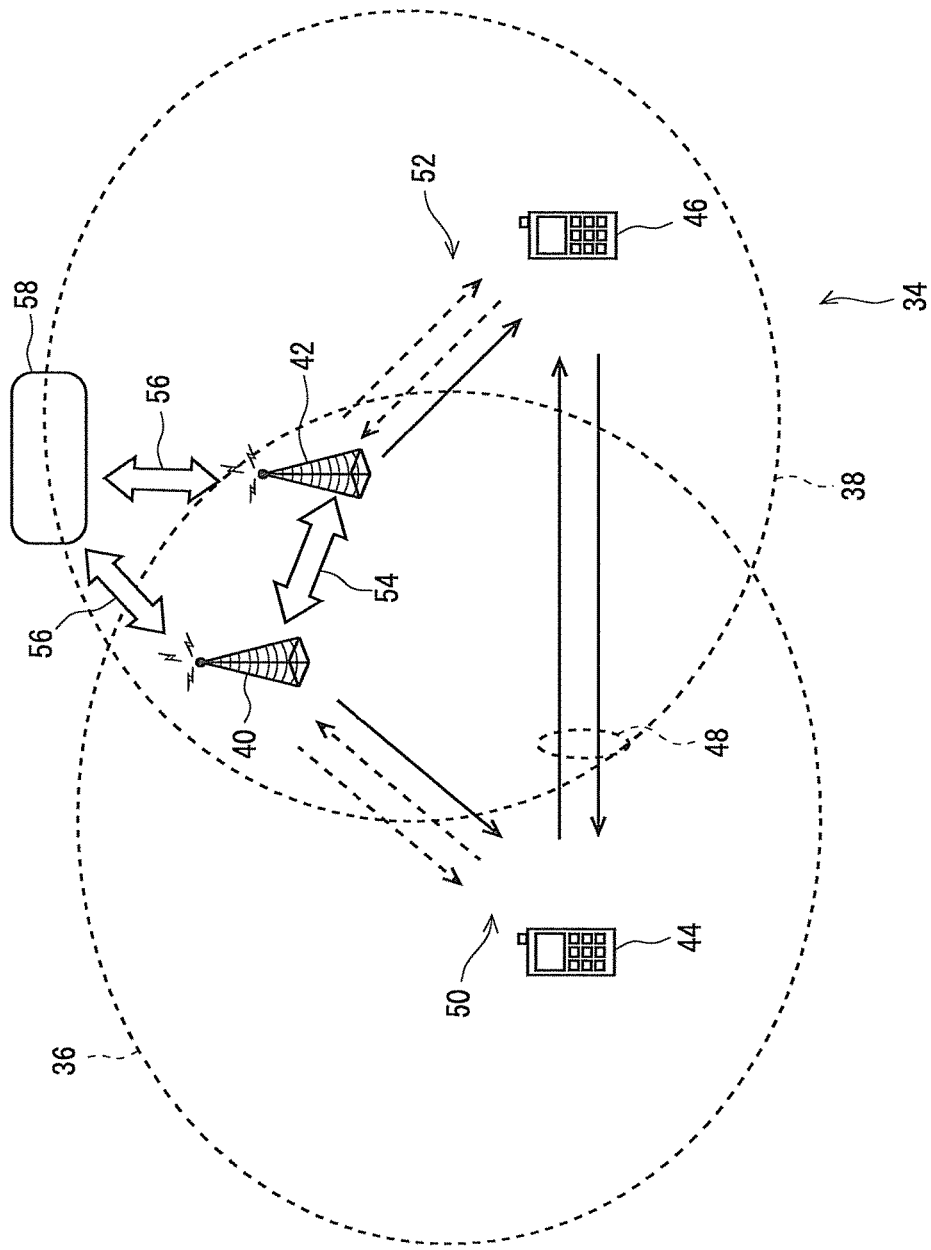
FIG. 2 is a schematic representation of inter-cell communications between a pair of mobile radio communication devices according to another embodiment of the present invention.
Figure 3:
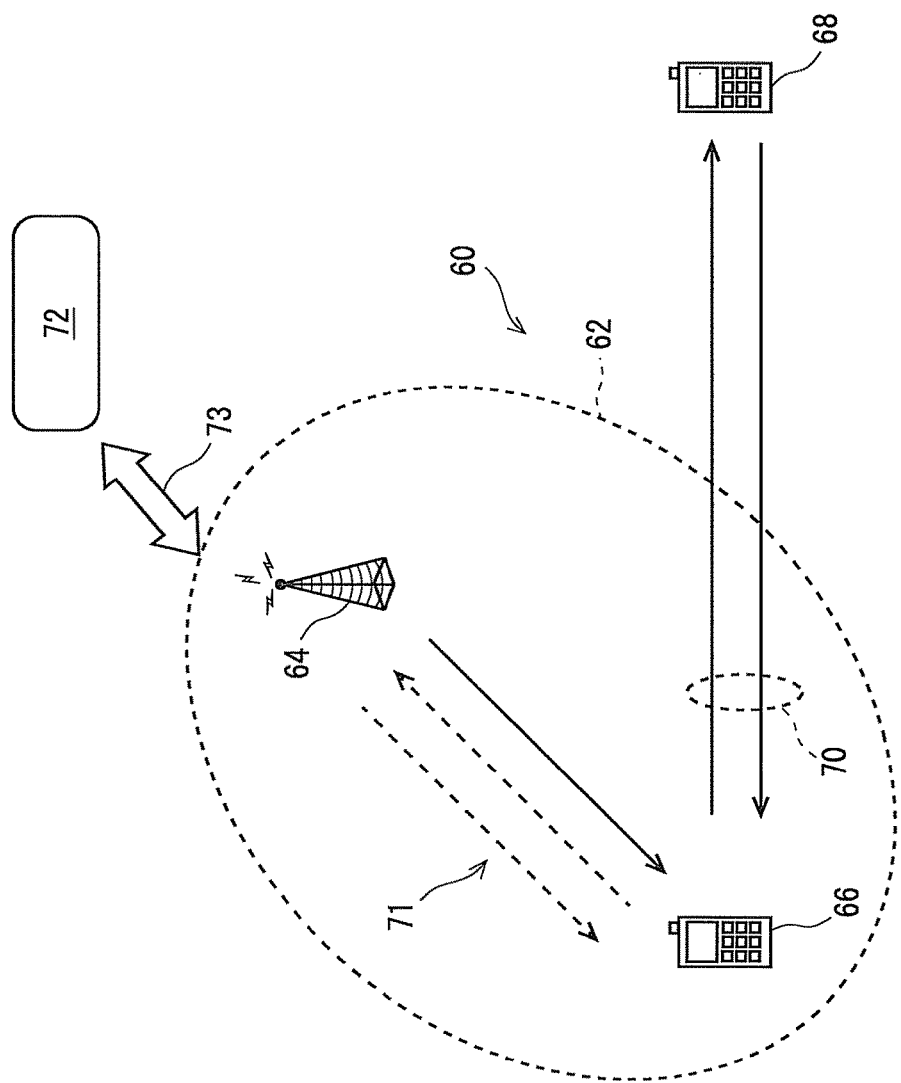
FIG. 3 is a schematic representation of out-of-coverage communication between a pair or mobile radio communication devices and according to a further embodiment of the present invention.

Turning first to FIGS. 1-3, there are illustrated schematic representations of cells within a cellular communications network and involving communication between the plurality of mobile radio communication devices which, in this particular illustrated embodiment, comprise UE devices such as mobile phone cellular handsets. It will however be appreciated from discussion elsewhere in this document that the invention is not restricted to such mobile radio communication devices nor to the exact details of the network and related communication protocol as illustrated in the Figures. For example the devices could comprise PDAs, laptops, tablets, PCs, WiFi, WLAN or other, access points including Small Cell (i.e. low power node) access points.

Turning first to FIG. 1, there is illustrated a region of a mobile radio communications network 10 comprising a cell 12 served by an eNB base station 14 which, as illustrated in FIG. 1, provides coverage and control of first 16 and second 18 UE devices.

In addition to communication under network control by way of base station 14 and the related network, the devices 16, 18 are also arranged to communicate directly by way of, for example, D2D connectivity 20. In this illustrated example therefore, both devices 16, 18 can be involved in D2D communication while also under the control and coverage of the common base station 14. As discussed in further detail below, and based on indication from at least one of the devices 16, 18, the base station 14, or indeed any network entity associated therewith, can be arranged such as by way of an algorithm, to compute a further control command for on-going communication between the devices.

Remaining with FIG. 1, and referring to the numbered arrows indicating communication between the each of the devices 16, 18 and the base station 14 the signalling generally arises as follows.

Considering first the signalling between the base station 14 and the device 16, base station 14 on behalf of the network, first configures the device 16 by way of configuration signalling 22 including a link-quality parameter threshold value. Then this device 16, while conducting D2D communication 20 with the device 18, monitors the actual quality of the D2D link and with reference to the threshold value. If the threshold is breached so as to indicate insufficient link-quality, a signal 24 indicating such low link-quality is sent from the device 16 to the base station 14. The base station 14 subsequently issues a command signal 26 serving to control on-going operation/connectivity of the device 16. As an alternative, an indication can be provided that the measured D2D RSRQ (or other quality parameter or QoL indicator as discussed herein) can comprise an average determined over a certain period. Then the NW can configure the particular averaging point and/or the averaging period. Of course in other examples the averaging period can be pre-set in the device without requiring configuration by the NW.

As explained in further detail below, such control may serve to reallocate dedicated resources associated with the D2D communication 20 or alternatively can serve to redirect the communication link between the two devices 16, 18 by way of the network.

As further illustrated in FIG. 1, similar configuration 28, quality indicator 30 and command 32 signalling between the base station 14 and the second device 18 can likewise arise and have similar functionality to that discussed above in relation to device 16.

Turning now to FIG. 2, there is illustrated a network environment 34 comprising two cells 36, 38 each served by a respective eNB base station 40, 42 and wherein the respective cellular devices (44, 46) are under the coverage and control of each respective cell 36, 38 as illustrated.

Although the two devices 44, 46 are under coverage and control of different respective cells 36, 38, it should be appreciated that the mutual network environment between the devices allows for direct communication by way of D2D communication link 48.

As with the example of FIG. 2 signalling arising between each respective device 44, 46 and the network allows for configuration, indication and command actions 50 and 52 in turn respectively. That is, with regard to device 44, the network, by way of the base station 40, first provides a configuration signal to the device 44, which responds with indication as to when a low link-quality is identified having regard to the link-quality parameter threshold value set by the configuration signal, such that the base station 40 can, in turn, issue an appropriate command signal to the device 44. In one scenario, configuration can occur twice or three times before obtaining an indication, or indeed multiple indications may arise. It should also be appreciated that the command is not in itself considered essential.

Although in this illustrated example the device 46 is under the control and coverage of a base station 42 belonging to a different cell 38, a similar series of signals 52 are sent between the base station 42 and device 46 so as to provide for initial configuration of the device 46 with the link-quality parameter threshold value, an indication of low link-quality to the network and subsequent command from the network to the device 46 which controls as appropriate, the on-going communication scenario between the two devices 44, 46.

As before, the changes again comprise the re-allocation of dedicated resources in relation to the D2D communication link 48, or could comprise switching communication between the devices 44, 46 to the network and associated base stations 40, 42.

In any case, the base stations 40, 42 can remain in communication by way of an X2 link 54 and, by way of S1 signalling 56, common control within the whole network can be achieved by way of a common Mobile Management Entity (MME) 58.

As before, the computation within the network as to the nature of the command signal to be delivered to one or both of the devices 44, 46 can be conducted within the base stations 40, 42, or within another network element such as the MME 58 as required.

With regard to FIG. 3, there is illustrated an embodiment in which one of the said of devices is located "out-of-coverage" and so is not under direct control and coverage of the network. This scenario is however also applicable to the case in which, although both devices are under NW coverage, only one is controlled by the NW.

As illustrated, the network environment 60 comprises a single cell 62 having an eNB base station 64 for providing control and coverage of a cellular UE device 66 while a second cellular device 68 is located "out-of-coverage" of the network. The environment is however still such as to support direct communication by way of a D2D communication link 70.

As before, a series of signalling 71 between the base station 64 and the "in-coverage" device 66 arises so as to provide for initial configuration of the device 66 with an appropriate link-quality parameter threshold value, subsequent indication of low link-quality of the D2D communication 70, and subsequent receipt of an appropriate command signal from the base station 64 which, again, can provide for appropriate changes to the communication resources allotted/shared between the devices 66, 68. That is, in the illustrated embodiment, network control of the D2D communication is maintained by way of the network connectivity of the device 66 and, based on perceived indications of possible low link-quality from the device 66, the base station 64, or other network component such as MME 72 communicating with the base station 64 by way of an S interface 73, is arranged to compute the functionality contained within the subsequent command signalling from the base station 64 to the device 66.

Turning now to FIG. 4, there is provided a timing diagram providing a general illustration of signalling arising according to an embodiment of the invention providing for command signalling from the network. This figure provides a general context overview of a particular embodiment of the invention illustrating the reduced overhead requirements of the invention. Along the horizontal time-line illustrated, one of two UE devices involved in D2D communication receives a configuration message 74A from the network (including any appropriate reference value such as a RSRQ Thr. threshold value). Then, one or more (as required) reports 74B, 74C, 74D are provided from the UE indicating low D2D link-quality. These are received by the network which then, responsive to the low link-quality indications, enters into command signalling 74E with the UE devices for subsequent control of the communication between those devices.

As discussed further herein, there is a variety of scenarios of how, and on what basis, the report and command signals are triggered, but a particular advantage is that configuration of the UE device(s), and reporting from the UE device(s) is required less often than in the current art. The reporting can also require less throughput and the indication can be provided by only one bit, rather than requiring a multi-bit value.

Further details of the signalling arising between the base stations and devices of FIGS. 1-3 are now discussed and further illustrated in with reference to FIGS. 4-8.

Figure 5A:
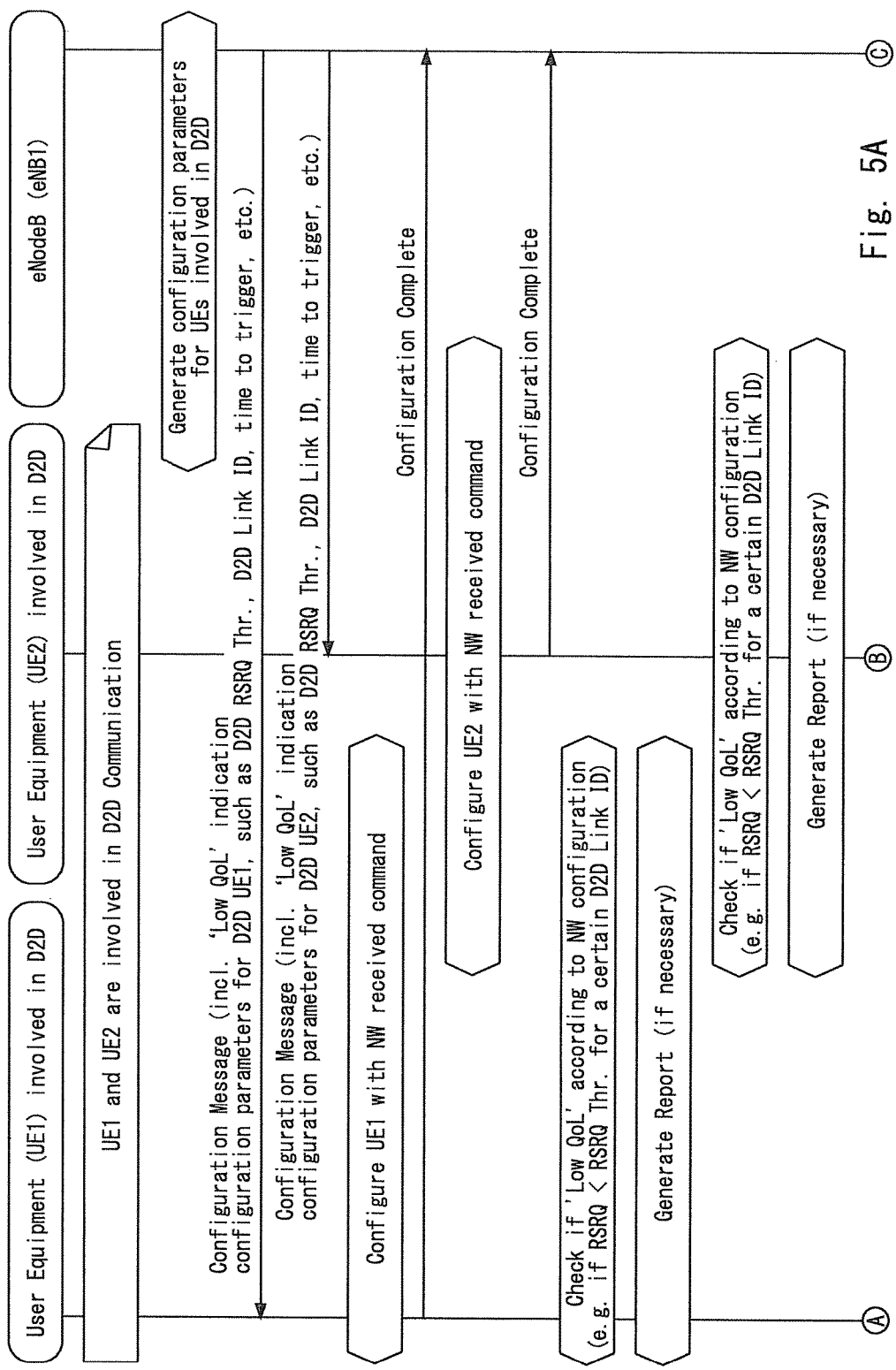
FIG. 5A is message sequence charts illustrating signalling arising for an embodiment of intra-cell D2D communication according to an embodiment of the present invention such as that of FIG. 1.
Figure 5B:
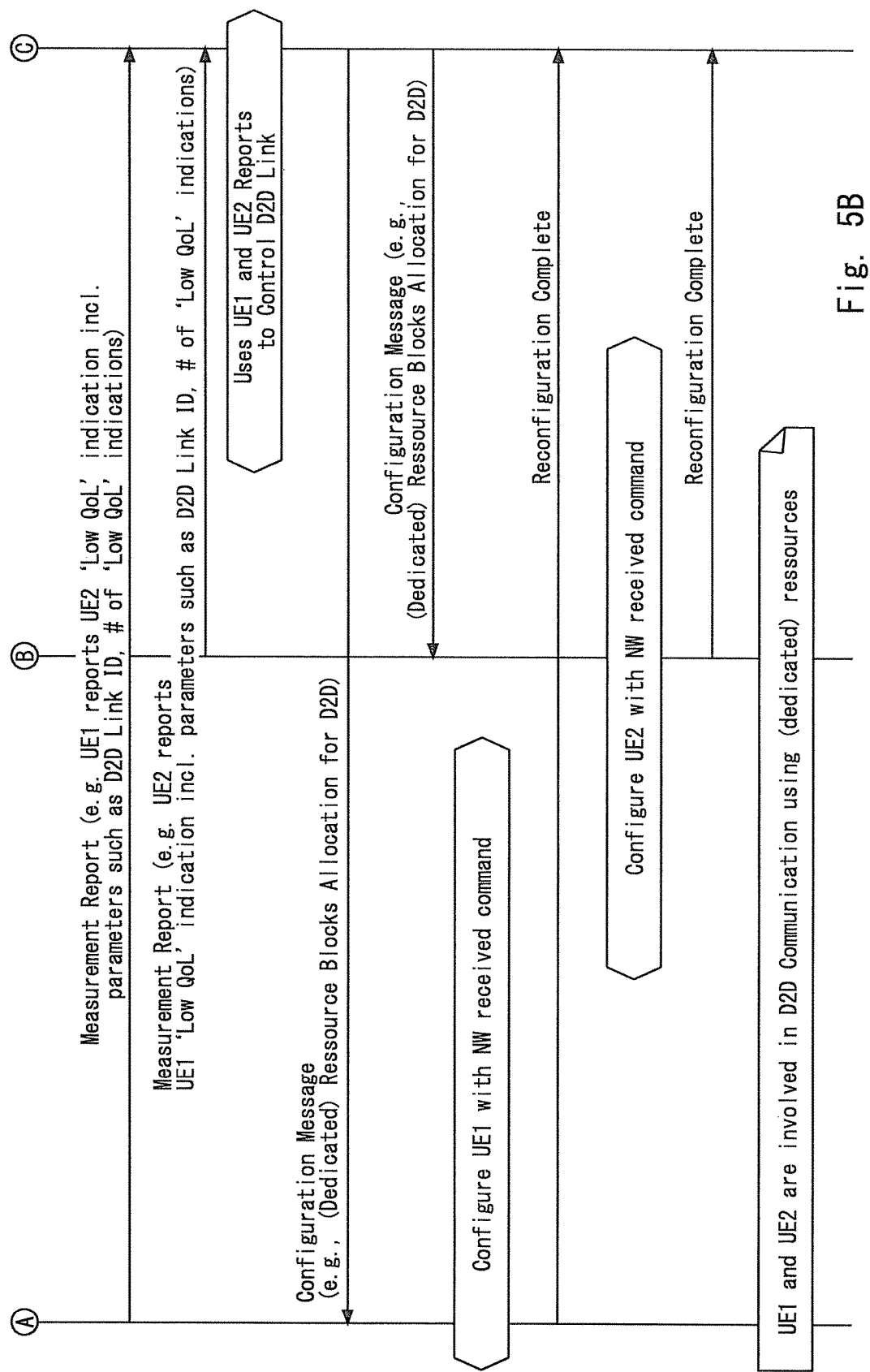
FIG. 5B is message sequence charts illustrating signalling arising for an embodiment of intra-cell D2D communication according to an embodiment of the present invention such as that of FIG. 1.

FIG. 5A and FIG. 5B comprise a message sequence chart relating to intra-cell D2D communication such as that illustrated with references to FIG. 1.

As noted, signalling arising between each of first and second User Equipment terminals (UE1) and (UE2), and a common eNB base station (eNB1) is illustrated, and the procedure commences with both UE devices involved in a D2D communications session.

The eNB1 then generates the appropriate configuration parameters and configuration messages are delivered as shown to both UE1 and UE2 so as to indicate to each device the appropriate link-quality parameter threshold value.

Each device UE1, UE2 can then issue a "configuration" complete signal to the eNB1 and conducts on-going monitoring of the D2D link-quality for comparison with the threshold value.

The manner in which each UE device conducts such monitoring, and storing or immediately acting on, the results of such monitoring before providing appropriate reports to the network can vary as required and as discussed further below. In particular, the reports can be initiated simply as and when the threshold value is breached, or by means of periodic implementation at set time intervals, or on an event-driven basis as noted in particular detail. If appropriate, the breach of the threshold can be determined on an average basis as noted above.

Returning to FIG. 5A and FIG. 5B, once the threshold value is breached, a measurement report is provided by the UE device identifying the breach and the eNB1 employs such reports so as to provide a further control signal relating to the identified D2D link. This further control signal may comprise a further configuration message serving to reallocate dedicated resource blocks, or dedicated resource elements as required.

The UE devices are then reconfigured to continue their D2D communication but in accordance with the re-allocated (dedicated) resource blocks/elements in an attempt to improve link-quality.

Once such reallocation is complete, appropriate confirmation messages can be provided from the UE devices UE1 and UE2 to the base station eNB1.

Figure 6B:
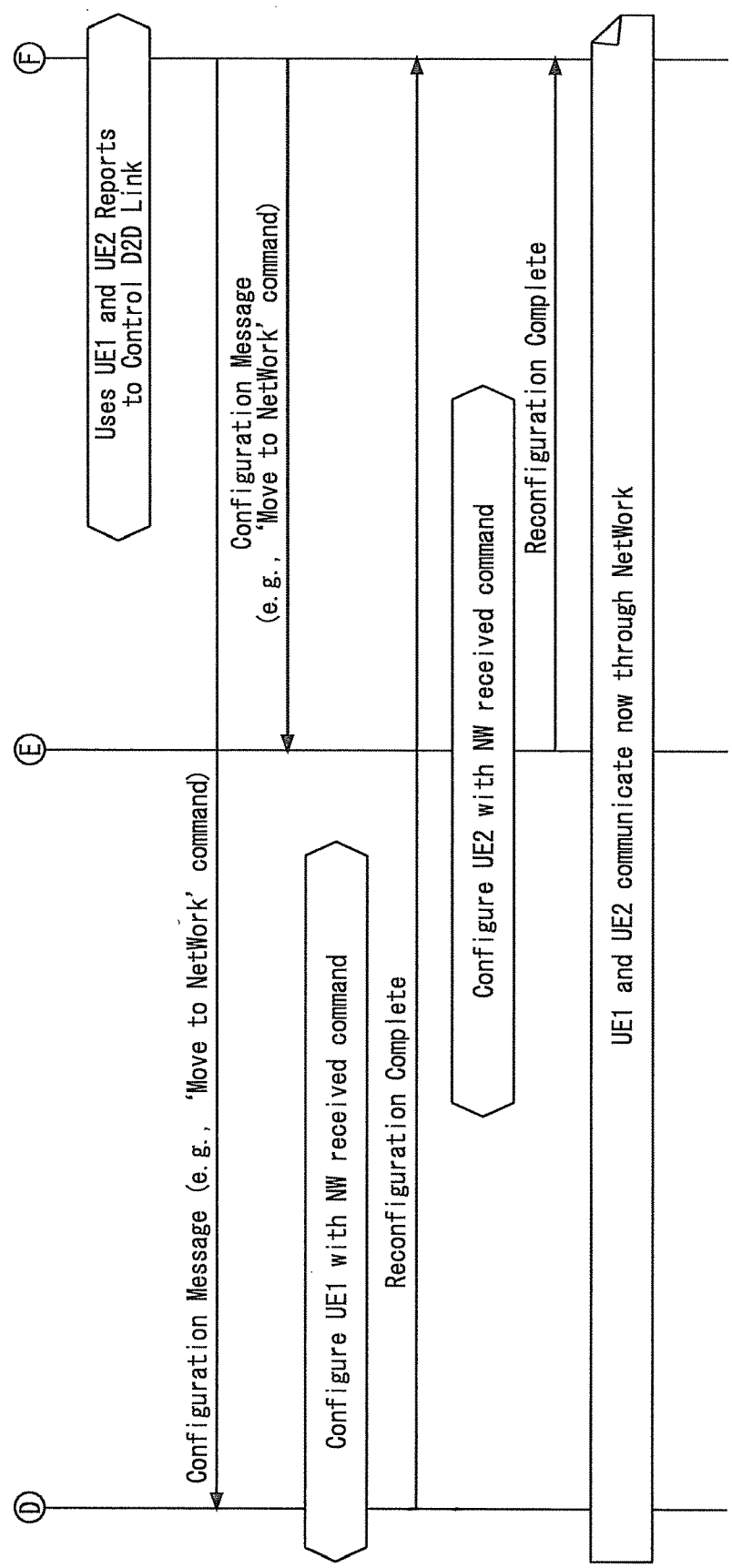
FIG. 6B is message sequence charts illustrating signalling arising for an embodiment of intra-cell D2D communication according to an embodiment of the present invention such as that of FIG. 1.

Turning now to FIG. 6A and FIG. 6B, a similar scenario is indicated but, once breach of the link-quality threshold within one or both of the devices UE1 and UE2 is identified, and reported to eNB1, the control message in this example serves to move the communication link between the devices to the actual network rather than allow continued direct communication and so the reconfiguration message as illustrated from the eNB1 is a "move to network" command.

Each device UE1, UE2 then responds with an appropriate configuration complete message.

Figure 7A:
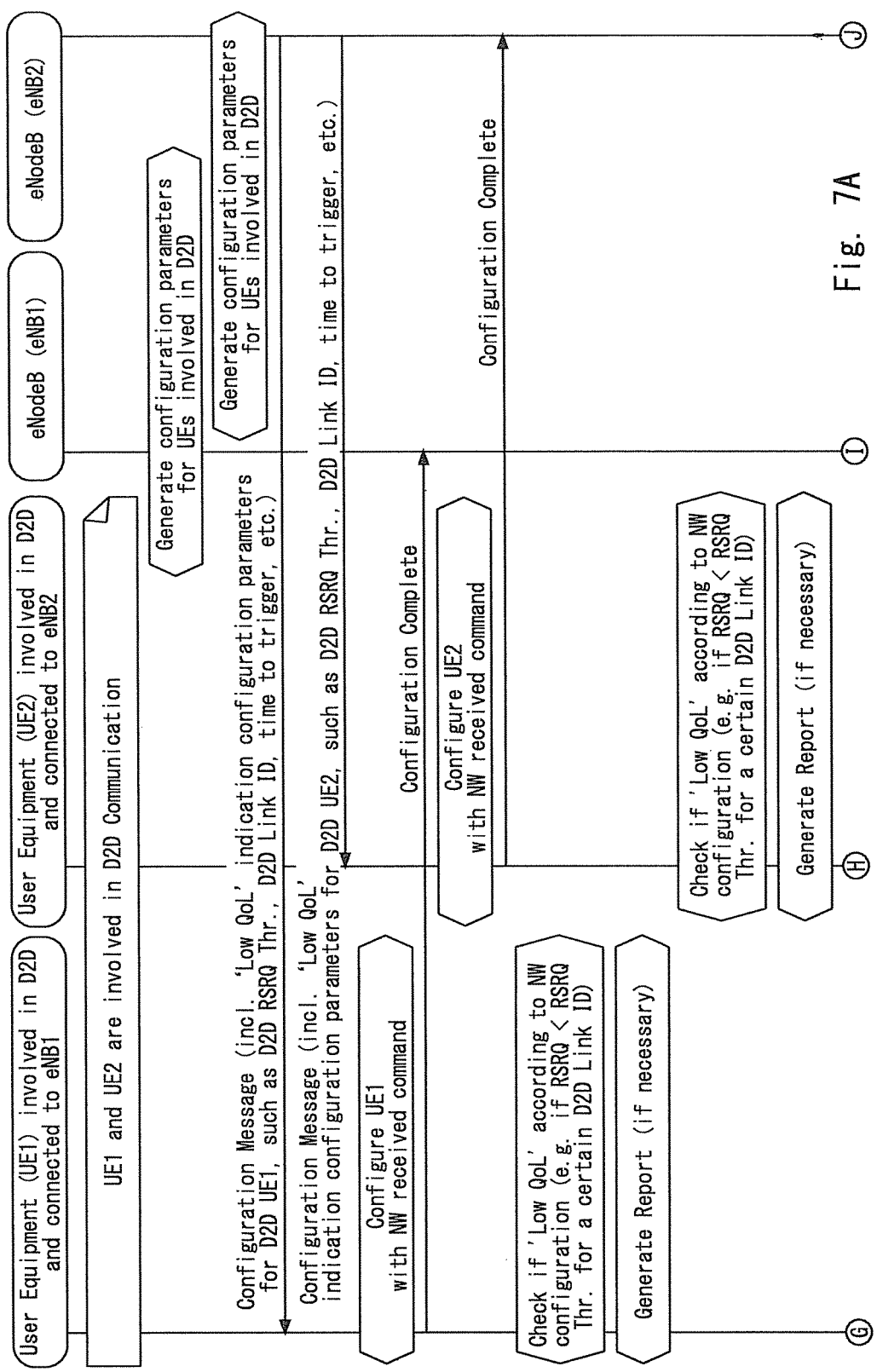
FIG. 7A comprises message sequence charts for inter-cell D2D communication according to an embodiment of the present invention such as that of FIG. 2.
Figure 7B:
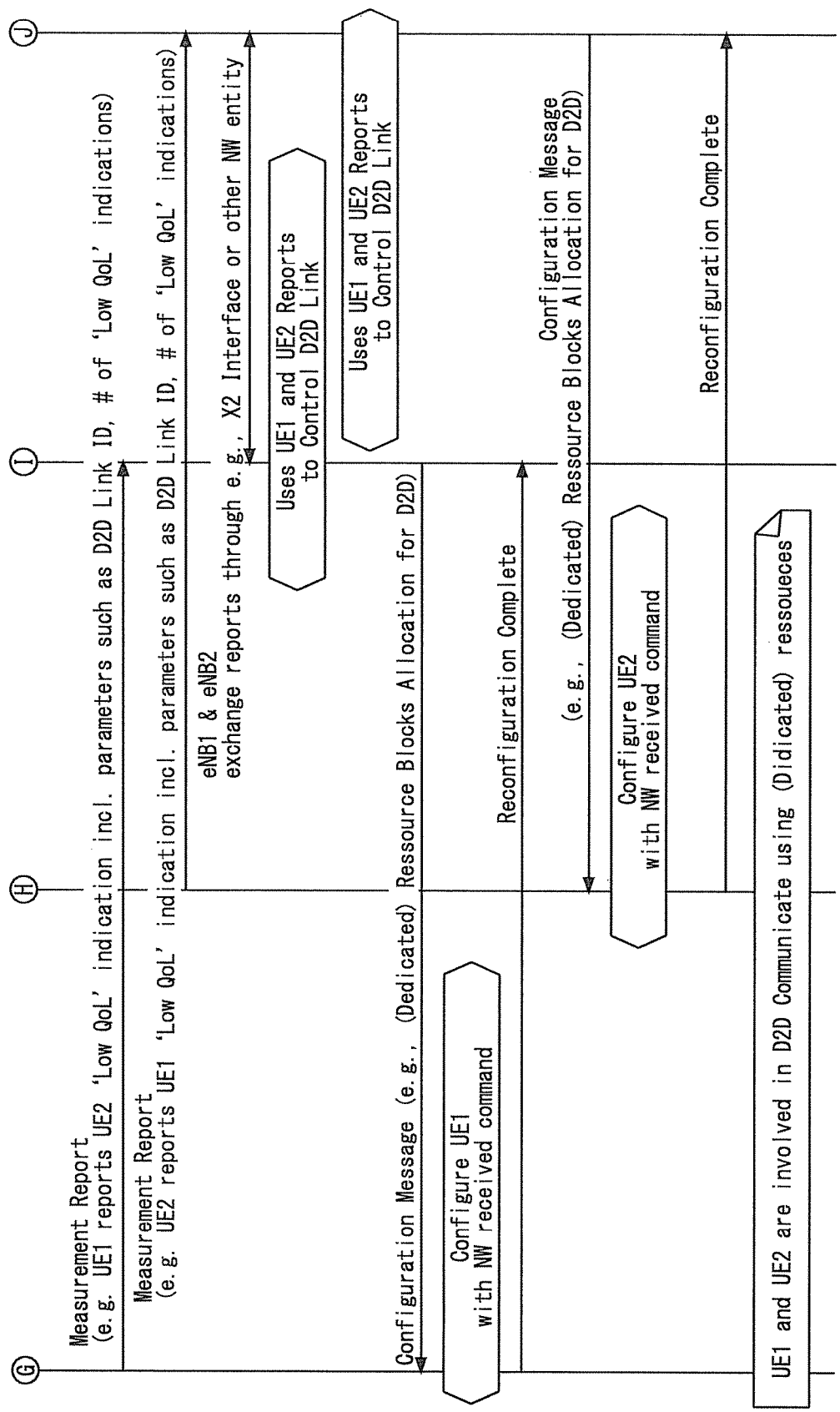
FIG. 7B comprises message sequence charts for inter-cell D2D communication according to an embodiment of the present invention such as that of FIG. 2.

With regard to FIG. 7A and FIG. 7B, there is illustrated a message sequence chart relating to the inter-cell D2D communication scenario discussed earlier in relation to FIG. 2.

As noted, the four communications elements this time comprise a pair of User Equipment devices UE1, UE2 and a respective pair of base station devices eNB1, eNB2 for two cells.

With UE1 and UE2 involved in D2D communication, eNB1 and eNB2 send initial respective configuration signals to those devices serving to set the particular link-quality threshold parameter values.

Both UE1 and UE2 are then configured according to these messages and confirm there respective configuration with appropriate "configuration complete" messages to the respective base station eNB1 and eNB2.

Each of the devices UE1 and UE2 then checks to determine if low link-quality is identified by reference to the configured threshold value which, as required, can include identification of the specific D2D link between the devices UE1 and UE2 and the appropriate report is generated and sent as a measurement report message as required.

If, having regard to the threshold value, the link-quality of the D2D connectivity is considered insufficient, control signalling is delivered from the eNB1 and eNB2 which, if serving to maintain the D2D connection, can comprise a dedicated resource block re-allocation message.

Once reconfigured by way of that network originating command, each User Equipment device UE1, UE2 provides a "reconfiguration complete" message to its respective base station eNB1, eNB2.

With regard to the embodiment illustrated in FIG. 8A and FIG. 8B, this represents an alternative conclusion to, or indeed continuation of, the message sequence chart of FIG. 7. Here, signalling arising when the control signal of the network, issued in response to a measurement report from one or more of the UE devices indicates insufficient link-quality, instructs that the on-going communication between UE1 and UE2 be conducted by way of the network, rather than by way of the direct D2D communication such that each base station eNB1 and eNB2 issues a "move to network" command as illustrated.

Thus, while in FIG. 7A and FIG. 7B, the effective response to an indication of low link-quality is to reallocate dedicated resources to improve the D2D communication; in FIG. 8A and FIG. 8B, the effective response is to move the communication session away from the D2D link and to the actual network.

With regard to FIG. 9A and FIG. 9B, there is provided a message sequence chart relating to the connectivity scenario illustrated with reference to FIG. 3 where only one of the two devices is located within a network cell, and the other is "out-of-coverage".

Figure 9A:
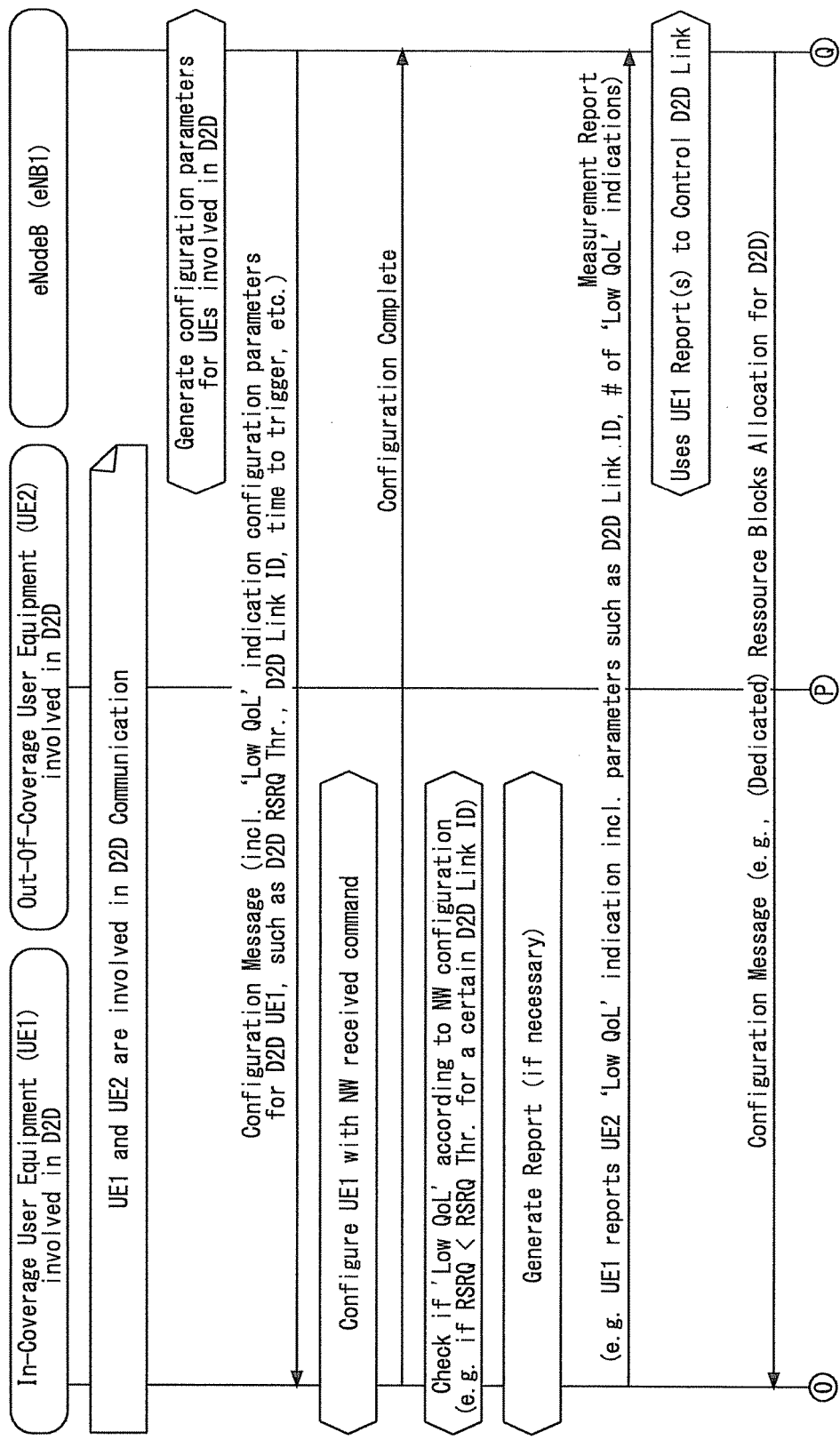
FIG. 9A is a message sequence chart illustrating an out-of-coverage embodiment of D2D communication according to the present invention an embodiment such as that of FIG. 3.
Figure 9B:
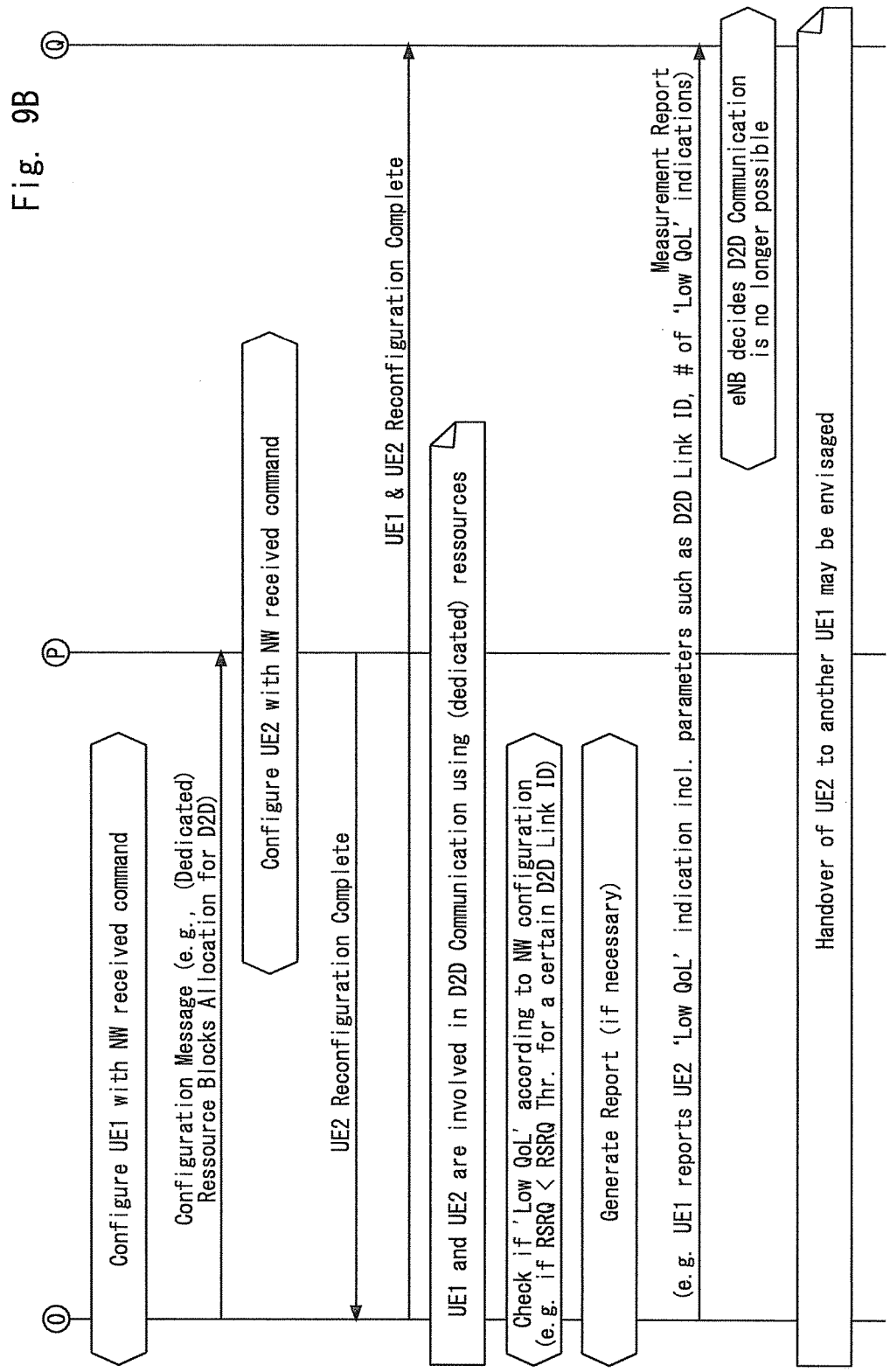
FIG. 9B is a message sequence chart illustrating an out-of-coverage embodiment of D2D communication according to the present invention an embodiment such as that of FIG. 3.

As will be appreciated from FIG. 9A and FIG. 9B, in this scenario in the message sequence chart illustrated here, the out-of-coverage User Equipment UE2 is not being involved in any direct signalling with eNB1 and the configuration, reporting and subsequent control signal as previous discussed are exchanged solely between UE1 and eNB1 as illustrated.

However, at the time UE1 has been reconfigured in accordance with the control signal from eNB1, for example suggesting a reallocation of dedicated resources such as a resource block reallocation, a configuration message is then delivered from UE1 to UE2 so that the reconfiguration requirement is applied to both devices UE1 and UE2. This can be seen as a dedicated D2D signalling message, or it can be part of the D2D communication (included in the bearer).

UE1 can then send a single signal, or individual message (not shown) to eNB1 confirming that the reconfiguration is complete for both devices UE1 and UE2.

However, subsequent to such common reconfiguration of both devices UE1 and UE2, but based solely on signalling arising from the UE1, a further link-quality check can be conducted in relation to the D2D communication between UE1 and UE2 and a further measurement report provided to eNB1 as indicated.

Should this further check indicate that the link-quality is still insufficient as compared with the threshold value then, as a result, handover of UE2 to another UE device can be initiated if appropriate.

From the above, it should be appreciated that reports from the UE devices can be generated in accordance with a variety of different scenarios based upon the occurrence of a particular number, if required a consecutive number, of low link-quality measurements as against the threshold value, or by way of periodic time-based implementation or event-based implementation as discussed further below with regard to FIGS. 10-17.

Within a general implementation, should neither of the UE devices indicate the low link-quality threshold has been breached, then there is no requirement for a command signal from the network to alter the communication link. Should either one of the two devices illustrate a link-quality issue, including consecutive low link-quality indications, then reallocation of (dedicated) D2D resources is instigated. Further, should both UE devices indicate a low link-quality threshold, or perhaps at least one of the devices indicate consecutive low link-quality threshold issues in consecutive measurements, then different control scenarios such as ending the D2D connection with a "move-to-network" command can be initiated.

Figure 10:
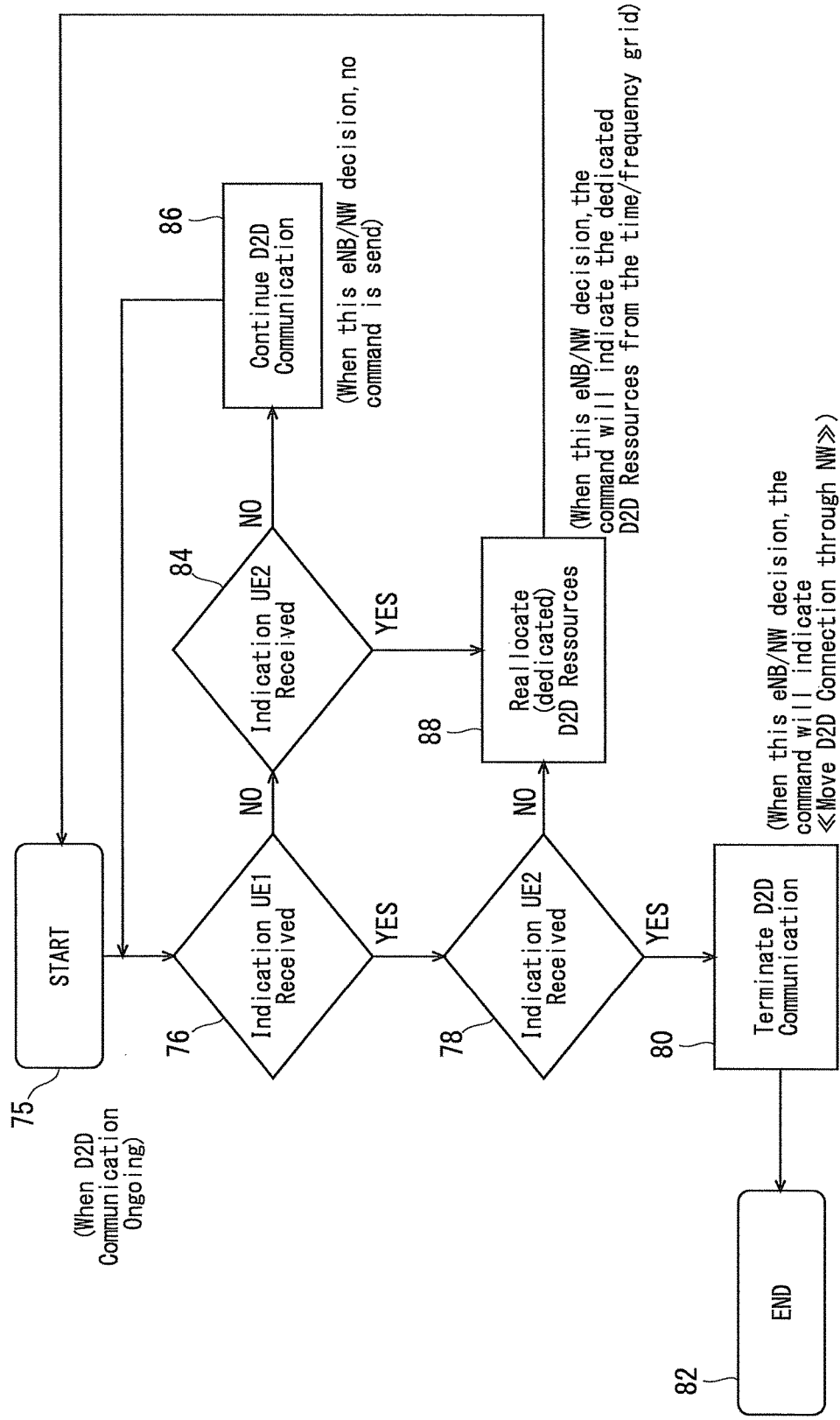
FIG. 10 is a flow diagram illustrating an embodiment of a general implementation of the present invention.

Such a procedure is illustrated with particular reference to FIG. 10 which, at 75, indicates the start of the control process at a time when D2D communication is on-going between UE1 and UE2, and is illustrated with respect to the NW side, focussing on particular on the NW reaction to receipt of the QoL indications.

At 76 it is first determined whether a low link-quality indication has been detected at UE1 in accordance with the reconfiguration achieved from the network. If such an indication has arisen, the procedure continues to 78 where it is determined if a low link-quality indication has also arisen in UE2. If it is determined that a low link-quality indication has also arisen in UE2, it indicates that both UE1 and UE2 are experiencing a low link-quality connection and the procedure continues to 80 where the D2D communication is terminated and concludes. At the termination of D2D communication, the network can issue a command such as "move D2D connection through network" at 82.

However, if at 76 it was determined that no low link-quality indication has arisen, the method continues to 84 where it is determined whether a low quality indication has arisen in UE2.

If at 84 it is determined that a low link-quality indication has arisen at UE2 (i.e. only one of the devices UE1 and UE2 provides low link-quality indication) then the method continues to 88 and the reallocation of (dedicated) D2D resources.

Of course, and as illustrated, if neither UE1 nor UE2 indicate low quality indications, then the process continues from 76 through 84 and 86 with the on-going D2D communication.

Figure 11:
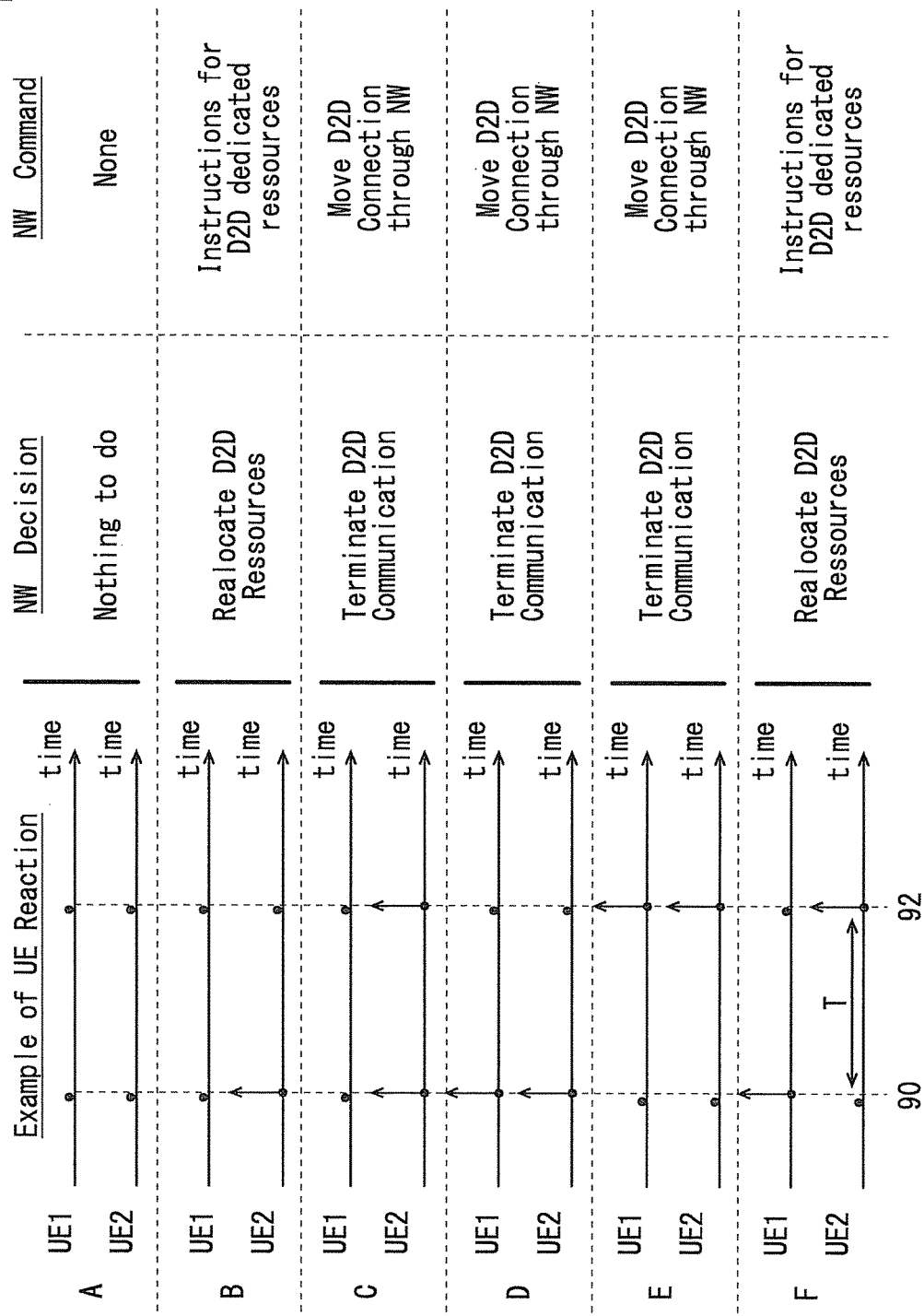
FIG. 11 is a table illustrating an embodiment of a periodic implementation of the present invention.

The table in FIG. 11 provides illustration of just one of many possible examples of an embodiment of a periodic-based implementation of the present invention illustrating the network based decision and network based command responsive to indications from UE1 and UE2 as to insufficient link-quality with regard to the threshold values. In the illustrated table, T represents the period of a timer between successive time instances 90 and 92. In this case, the UE may report with a periodicity T, or multiples thereof, and such periodicity of reporting may be provided by the NW side or preconfigured in the UE. Again references to the network based decision and network based command are just to two of many possible implementation examples.

Also it should be appreciated that FIG. 11, the left hand side, illustrates the manner in which a UE reacts, whereas the right hand side illustrated the manner in which the NW reacts and so these aspects of the invention may generally, but not exclusively, be considered implemented on the NW side.

In scenario A and within the time period noted, no instances of low link-quality are reported from UE1 and UE2 such that there is no decision to be taken at the network, and no command to be issued as indicated in the table.

For scenario B only UE2 provides a low link-quality indication and then only at a single instance at time 90. On this basis, the decision in the network is to reallocate D2D resources and the appropriate network command is issued such that the D2D communication will continue but with the reallocated resources.

Then with regard to scenario C, again only UE2 provides low link-quality indication but this time, two consecutive indicators are provided at times 90, 92 and the receipt of such report from UE2 at the network leads to a decision to terminate the direct D2D communication and with an associated command of moving the D2D connection between the devices through the network being issued.

In scenarios D and E, low quality indications arise simultaneously at both UE1 and UE2 and this likewise leads to a network decision to terminate the direct D2D communication and move the D2D connection between the devices through the network. However, it should be appreciated that one of the reports could be delayed due, for example, to an unexpected event, and in such case a time stamp would be applied to identify to which time the indication belongs. A time stamp could then be included in the report from the UE to the NW. Further, for MDT purposes, localization information could also be included, for example by way of GPS functionality. Such information would tend to be at the NW side under NW control and/or coverage.

Finally, and as illustrated as scenario F, with each device UE1 and UE2 providing a single low link-quality indication separated over the time period T, the network decision is to reallocate D2D resources thereby issuing a command to maintain D2D connection but with the dedicated reallocated resources.

Figure 12:
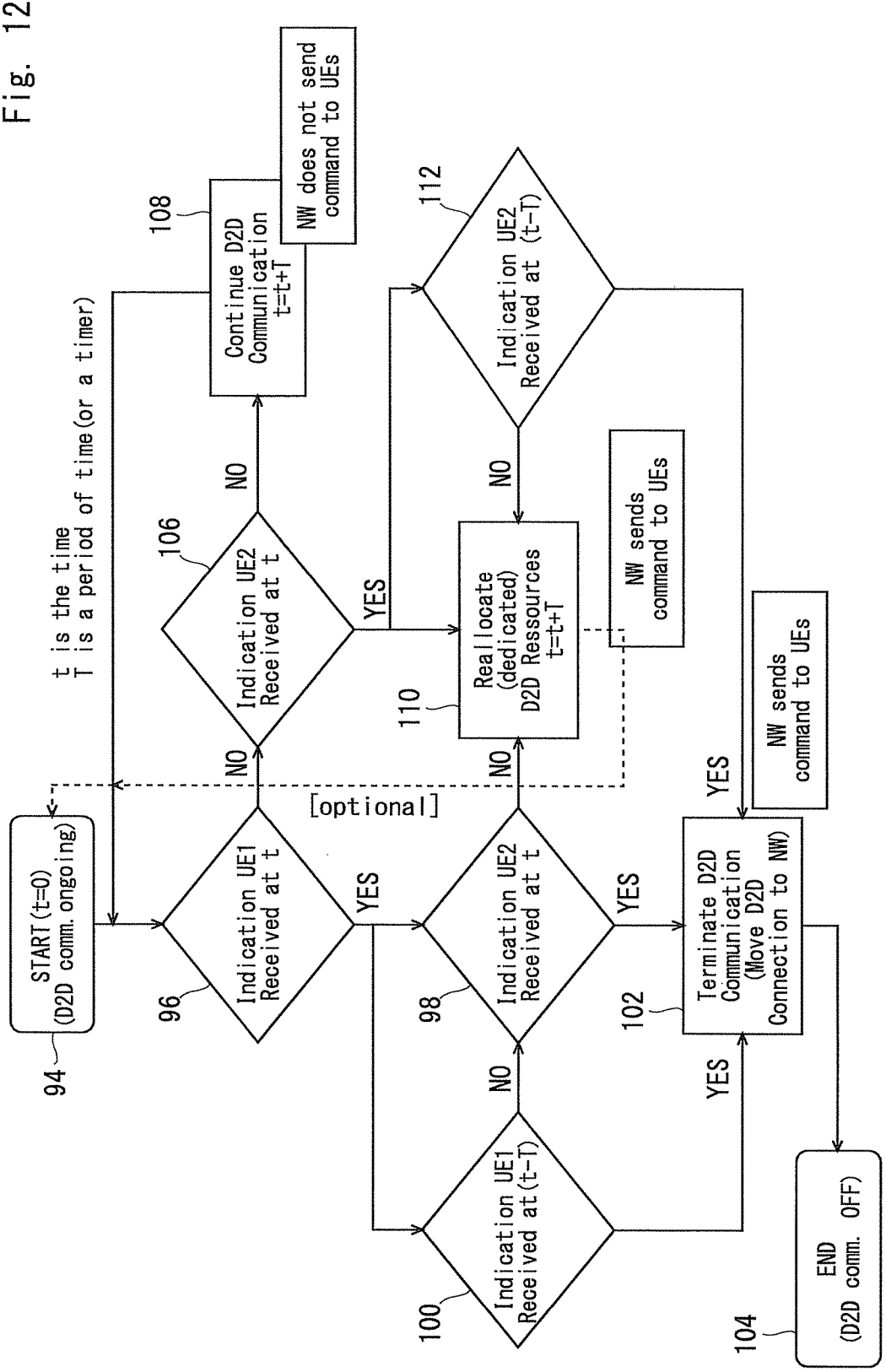
FIG. 12 is a flow chart illustrating an embodiment of a periodic implementation of the present invention related to the table of FIG. 11.

Such a procedure is illustrated further with reference to the flow-diagram of FIG. 12 and wherein the control process starts at 94 with D2D communication on-going between UE1 and UE2. At 96, it is determined that a low link-quality indication is received from UE1 and at time (t) and, if so, the procedure continues simultaneously to 98 and 100. At 98, it is determined whether a low link-quality indication has arisen from UE2 at that same point in time (t); or at 100 it is determined whether a further low link-quality indication has arisen at UE1 but received at a previous time (t-T).

If the answer to either of the determinations 98 or 100 is positive, then the procedure continues to 102 where the D2D communication is terminated and the connection between the devices moved to the network with the direct D2D communication being switched off at 104.

If, returning to 96, it is determined that no low link-quality indication has arisen at time (t) in UE1, then the procedure continues to 106 where it is determined whether such a low link-quality indication has arisen at UE2 at that same point in time (t). If no such indication has arisen at UE2, then the process continues to 108 to maintain D2D communication. The time is then incremented to (t=t+T).

If, however, at 106 it is determined that a low link-quality indication has arisen at time (t) at UE2 then the procedure continues simultaneously to 110 and 112.

At 110 and due also to the result from 98, it is determined that the D2D connection can continue, but with reallocated dedicated resources. The NW will then send the control command to UEs. In the same time, before or after this command the time is incremented to (t=t+T) and the algorithm could optionally continue either to 94 and 96. At 112 it is determined whether or not a further low link-quality indication has arisen at UE2 at the point in time (t-T). If this determination at 112 is positive, then the procedure continues to 102 and determination of the D2D communication with movement of the connection to the network and the direct D2D communication being turned off at 104.

However if at 112 it is determined that there is no subsequent low link-quality indicator from UE2 at the point in time (t-T) then the procedure continues to 110 where the D2D communication continues but with reallocated dedicated resources. The NW sends the command, the time is incremented to (t=t+T) (not necessary in this order) and the algorithm could optionally continue either to 94 and 96.

In addition, or as an alternative, to such a periodic-based implementation of the present invention, an event based implementation is likewise possible.

This is illustrated with reference to FIGS. 13-17.

Figure 13:
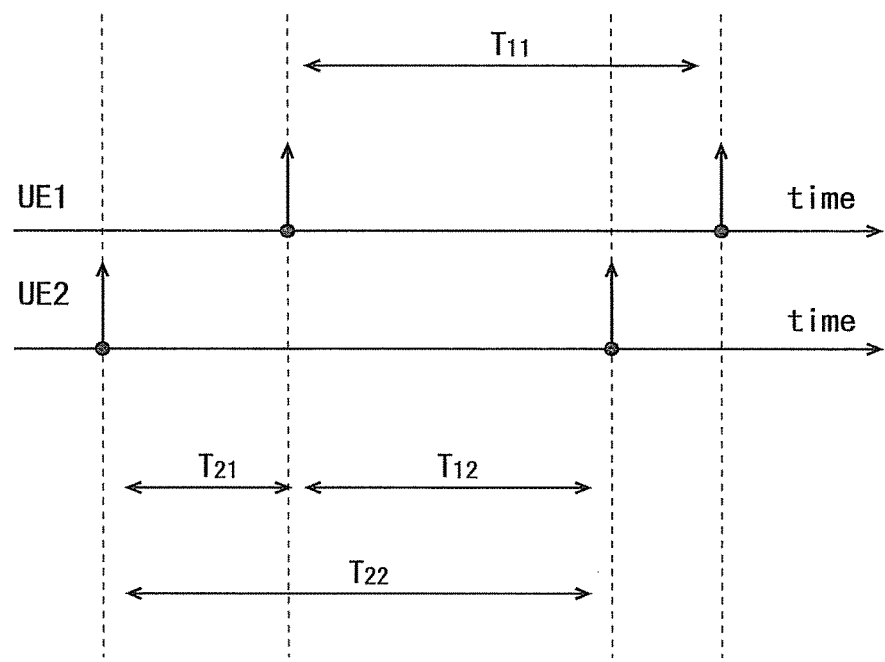
FIG. 13 is a timing diagram illustrating an embodiment of an event-based implementation of the present invention.

Turning first to FIG. 13, there is illustrated the generation of low link-quality indicator signals at devices UE1 and UE2 and the timing relationships between the points in time of generation of those signals; which time period values are provided in the further illustrations provided by FIGS. 14-17. FIG. 13 therefore generally illustrates examples of how the UEs might react.

Figure 14:
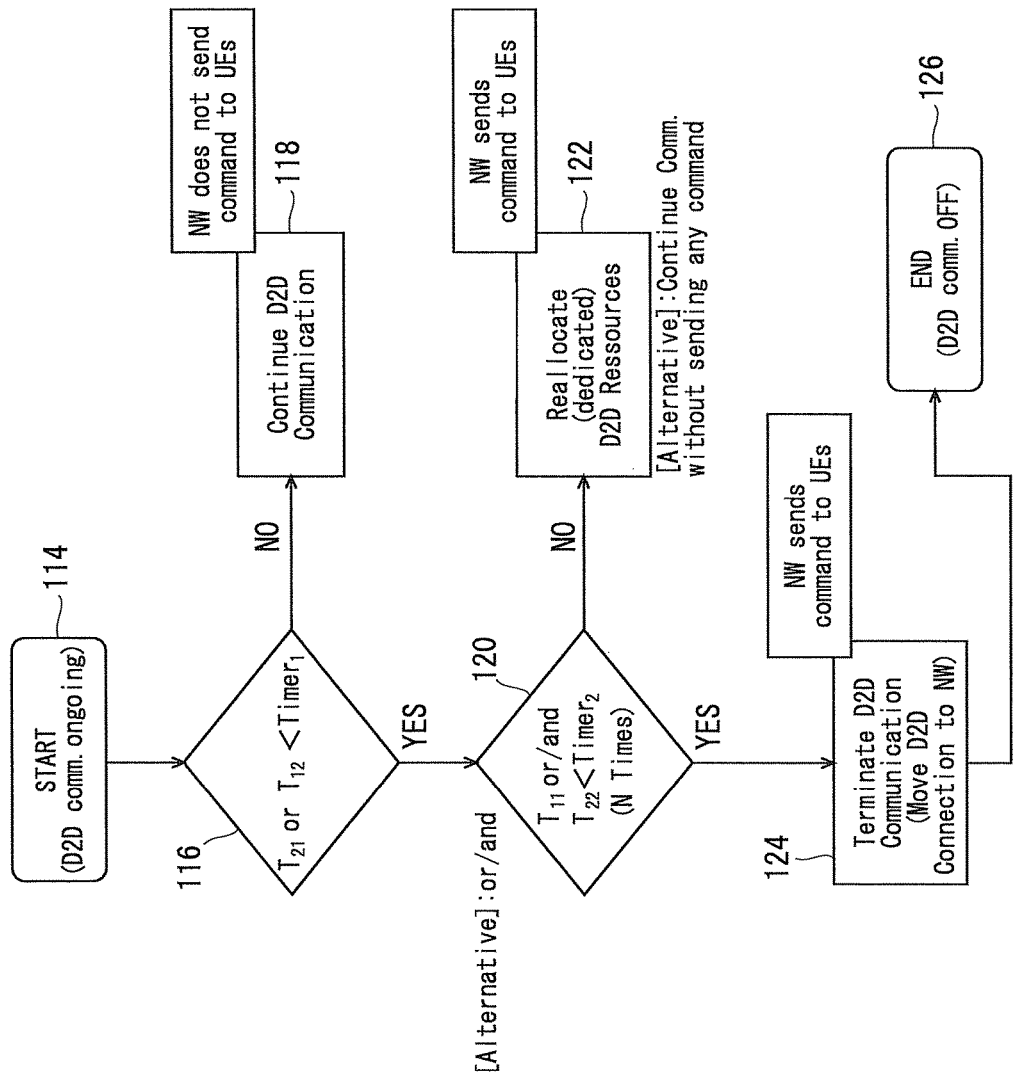
FIG. 14 comprises flow diagrams illustrating different examples of event-based implementations of the present invention.

With reference therefore to the representation provided of the generation of low link-quality indications provided by FIG. 13, FIG. 14 illustrates an embodiment of the present invention in which low link-quality indicating events occur almost at the same time, although not particularly frequently and wherein a factor N can be introduced to provide a delay or a decision as required at the network. Then, the initial condition is required to arise N times before the NW takes action to initiate direct D2D communication.

Thus, starting at 114 with D2D communication between the UEs on-going, the procedure continues to 116 where it is determined whether or not the time period T21 or T12 is less than a Timer1 threshold value. If either of those values is not less than the Timer1 threshold value then the process continues to 118 with continuation of the D2D Communication and no command signal is necessary from the network to the UEs.

If, however, at 116 it is determined that either of the time periods T21 or T12 is less than the Timer1 threshold value, it is next determined at 120 whether the time period T11 and/or time period T22 is less than the Timer2 threshold value. If, here at 120, it is determined that the T11 or T22 is not less than the Timer2 threshold value, then the procedure continues to 122 and the network sends a command to the UEs to reallocate dedicated D2D resources. As an alternative, the D2D communication could continue without a command being sent. Thus therefore, if N events are identified the determination is YES, and if not the determination is NO.

If, however, at 120 it is determined that the time period value T11 and/or T22 is less than the Timer2 threshold value then the procedure continues to 124 with a command to move the D2D communication to the network and, at 126, to terminate the direct D2D communication.

Figure 15:
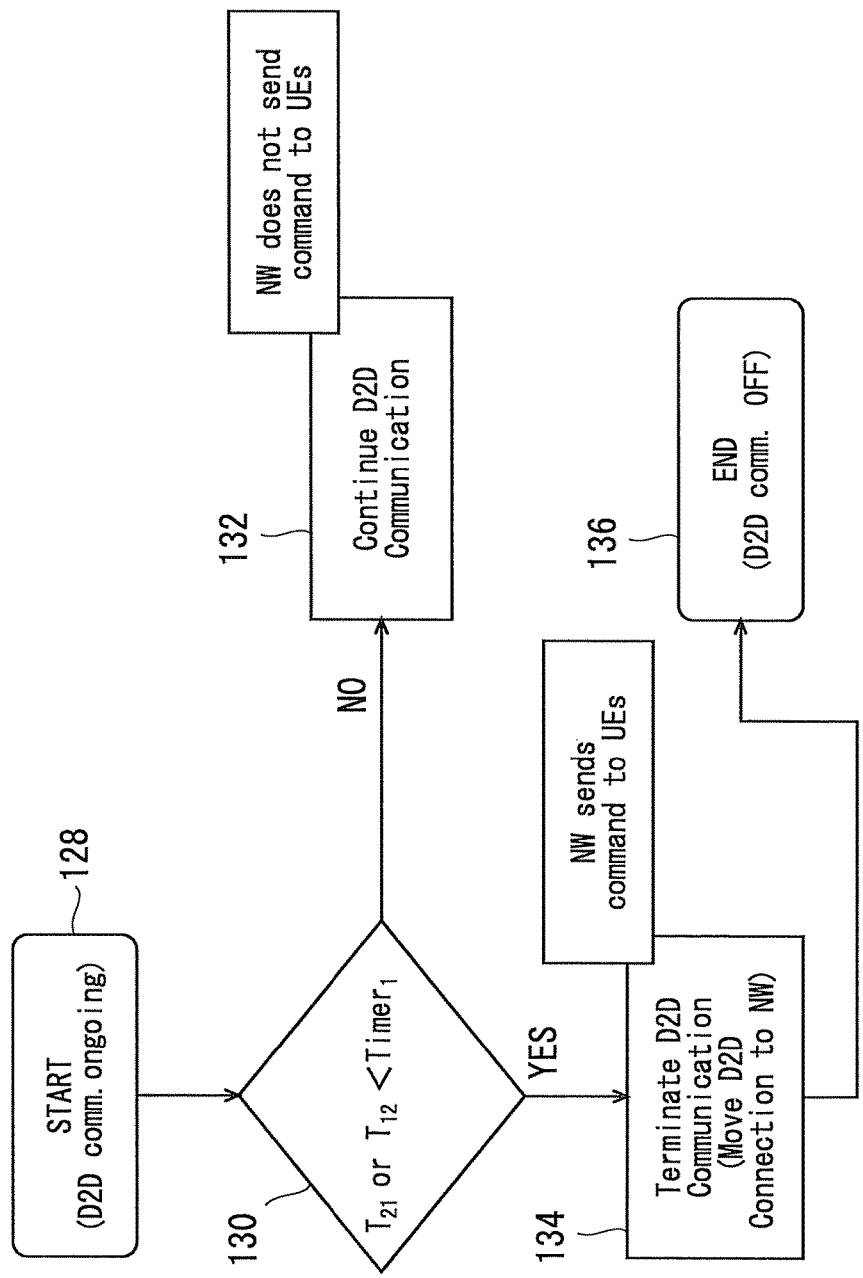
FIG. 15 comprises flow diagrams illustrating different examples of event-based implementations of the present invention.

FIG. 15 illustrates another example of an event-based implementation of an embodiment of the invention.

As with FIG. 15, the initial position 128 is at a point of on-going D2D communication between the UEs and a first determination at 130, is made as to whether time period T21 or T12 is less than a Timer1 threshold value. Again, if it is not, then the procedure continues to 132 with continuing D2D communication without the network having to send a command to the UEs.

If, however at 130 it is determined that those time values are less than the Timer1 threshold, termination of the D2D communication can be instructed at 134 so as to provide for the direct D2D communication being turned off at 136. As an alternative, such actions can be initiated if for example the event occurs M times.

Figure 16:
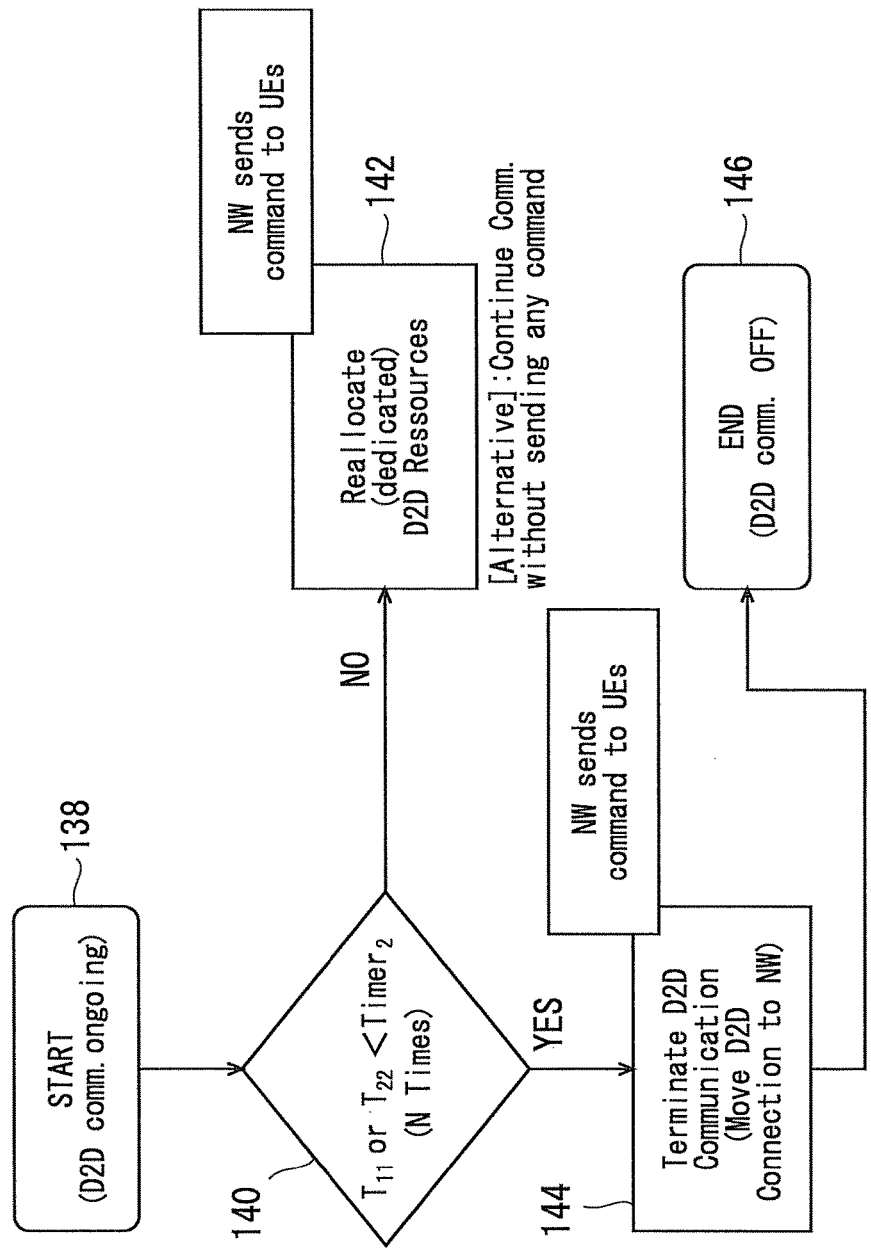
FIG. 16 comprises flow diagrams illustrating different examples of event-based implementations of the present invention.

In a further example illustrated in FIG. 16, the procedure, starts with D2D communication on-going at 138 and continues to 140 and a determination of whether one of the time periods T11 or T22 is less than a Timer2 threshold value. Again as an alternative such actions can be initiated if the event occurs N times. If neither of these are less than that threshold value, then the network sends of command to the UEs reallocating (dedicated) D2D resources at 142 although, as an alternative, the D2D communication could continue without a command being sent.

However, if at 140 it is determined that either of the time periods T11 or T22 is less than the Timer2 (either on one occasion or N times) then the procedure continues to 144 and the NW command to terminate direct D2D communication and possibly to move the D2D communication to the network whilst turning the direct D2D communication off at 146.

Figure 17:
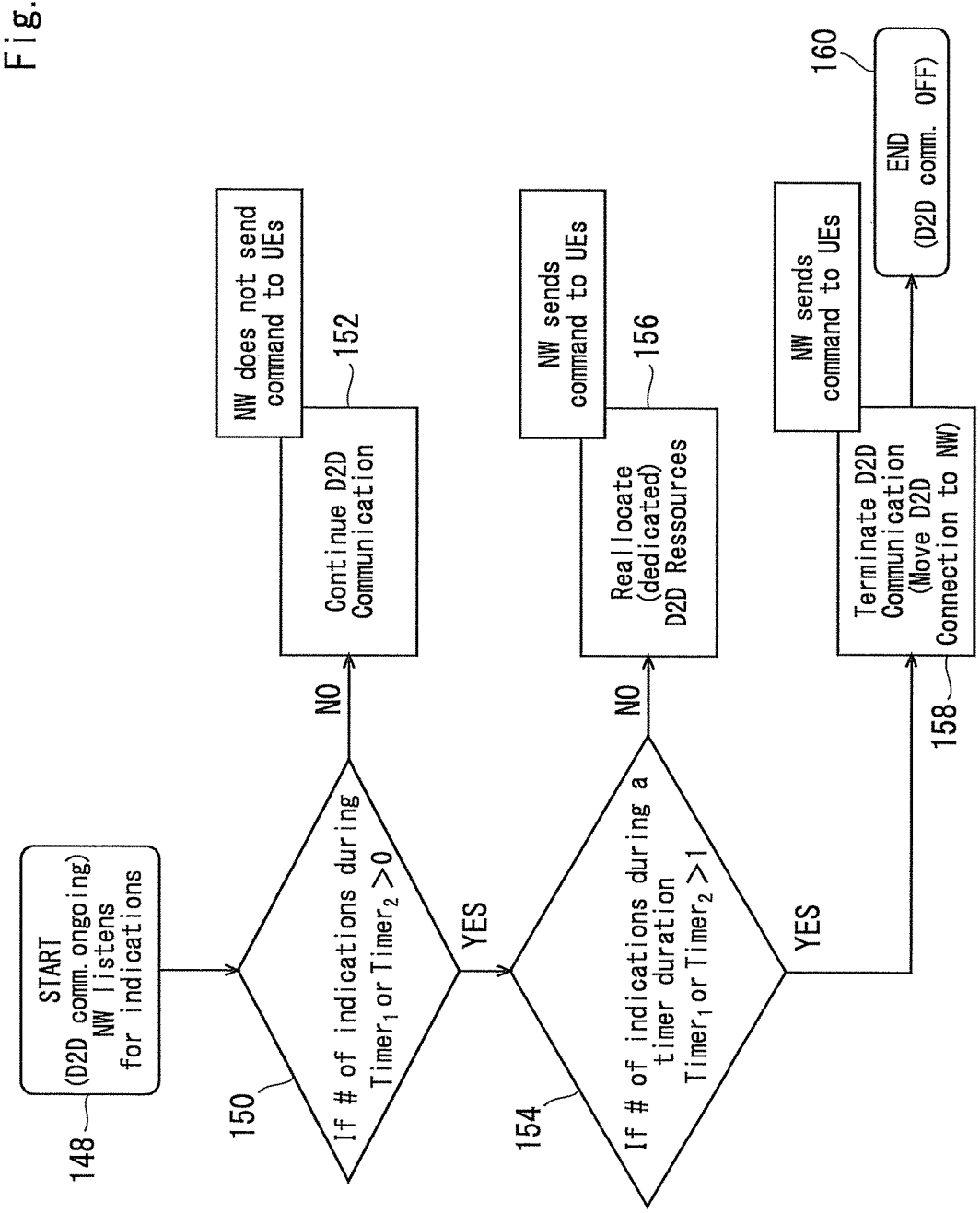
FIG. 17 comprises flow diagrams illustrating different examples of event-based implementations of the present invention.

As a final example of event-based implementation embodying the present invention reference is made to FIG. 17.

In this example, and illustrating at 148, D2D communication between the UEs is on-going and with the network monitoring for indications of low link-quality determination.

At 150 it is determined if the number of such identified indications during a time period Timer1 or Timer2 is greater than zero. If that number is not greater than 0, then the procedure continues to 152 providing for continued D2D communication between the UEs and without the network issuing a command signal. However, if, at 150 it is determined that the number of indications during either of those time periods is greater than zero it is then determined if that number of indications is greater than one. If this increased threshold value is not reached at 154, then the procedure continues to 156 and the reallocation of (dedicated) D2D resources by way of appropriate network command signal. As an alternative, the D2D communication could continue without a command being sent.

Yet further, if at 154 it is determined that this further threshold value is reached, then the procedure continues to 158 and a determination and preparation of a command from the network to terminate the direct D2D communication whilst moving the D2D communication to the network and, at 160 finally turning the direct D2D communication off.

As will be appreciated, the present invention introduces the concept of "Low Quality of Link (QoL) Indication" and how indication can be configured, and how a UE can trigger the information to the network.

The invention also proposes use of this indication for network control of the communication. Also, the network control need not be instant and network influence can be provided, based on the triggered information, for Minimization of Drive Tests (MDT) (e.g. usage such as for network planning or for network optimization). In this case the network is not compulsory sending control commands, but it will use this information for (further) planning purposes.

It should of course be appreciated that the present invention is not restricted to the details of the forgoing embodiments which are provided merely as illustrations of various possible examples of the present invention. Outlined below is a variety of possible further and alternative features and characteristics which may be adopted alone, or in any combination, as considered appropriate.

For example, indication could be computed and sent per Wide-Band or per Sub-Band frequency domain.

As regards the reference value forming part of the device/configuration, alternatives could include decrease/increase the threshold value rather than providing an exact value for the threshold. Thus, rather than providing a set threshold the network can increase or decrease a previous given threshold value in a previous configuration command.

A determination relative to the threshold of "<" can be replaced with "≤" and in some cases even with ">". ">" could also be replaced with "≥" or "<". It should of course be appreciated that this is applicable not only to configuration from MSCs such as in FIGS. 5-9, but also in relation to event-based implementations such as those of FIGS. 14-17. In some instances, the criteria for determination such as the "<" or ">" noted above can be sent and configured by the NW, or preconfigured by the UE. The NW could also update a value that had previously been preconfigured by the UE.

Further, a new condition: "If Time<Thr." YES, could be included to prevent sending the command, and it is possible to set a time to trigger for reports and for commands. Also, offsets and hysteresis values could be included amongst the relevant conditions.

As noted above, the invention can be applicable to intra-cell and inter-cell scenarios but it can also be adapted for out-of-coverage scenarios (in this case only in-coverage UE will signalize zero times, once or twice and NW will decide).

In the case of out-of-coverage situations, it can be assumed that the network interrupts D2D connection after the reception of one single indication. In this case the network can terminate connection of UE2 with UE1 and may decide to move UE1 to other UE (e.g. UE3).

The command message can be send to one UE, to both UEs using different messages, or through a common message to both UEs.

With regard to periodic or event-driven implementations, the <<Time to Trigger>> can comprise a parameter which may be computed considering a link-quality requirement on the network side; this parameter might be send to UE.

<<Timer>> is a parameter which may be computed considering a link-quality requirement on the network side; this parameter is not sent to UE.

The network could also determine if two consecutive triggers UE2 (or UE1) are related to the same event or not. For example, if T22 (or T11)<<T11 (or T22), this means that the UE2 triggers related to T22 (or T11) is from the same event as the first trigger UE1.

In one particular example, the UEs could use UL and/or DL LTE resources or others (non-LTE).

As a further feature, a new condition: "If Time<Thr." YES, then:
  UE do not send report and/or
  network does not send command (we could set a time to trigger for reports and for commands) could be adopted to control the device reporting and network controlling.

It should also be appreciated that one of the two devices can be any network equipment (e.g. network node or radio access network node or others), and the messages sent between the network and devices can employ any appropriate medium such as through RRC messages or other similar (known) 3GPP configuration/reporting messages such as PUCCH, PUSCH or other.

Also, the configuration and reporting parameters could be included in some already existent 3GPP messages or can be distinct messages, and the configuration and reporting can be initiated periodically or by triggered events (both periodically or aperiodically).

Of course, the inventive concept is not limited to 3GPP technology, and non-3GPP technology can be employed between the two D2D devices, such as for example WiFi, FlashLinQ, Bluetooth or WiMAX.

As part of the central signalling, the network could also seek to increase the power of the other D2D UE if the report received from the D2D UE is not satisfactory.

As one particular example, the <<Configuration Message>> can comprise a RRC Connection Reconfiguration message; and/or the <<(Re)Configuration Complete>> message can comprise a RRC Connection Reconfiguration Complete message; and/or the <<Measurement Report>> message can comprise a RRC Measurement Report.

As other particular example, the configuration can be performed using a MAC element or control element and the reporting can be performed by using another MAC CE (Control Element) or other such as a modified BSR (Buffer Status Report) MAC CE or a new BSR MAC CE for D2D purpose.

However, as an alternative to the use of RRC messages, other 3GPP messages from other layers (e.g. Layer 2 messages) could be employed if preferred.

With regard to the configuration messages from the network to, for example, the UE devices, there are various possible characteristics that can be employed. For example the messages could be sent in the same time or not; could be sent per D2D Link ID or per UE; the order could be different than represented in MSCs (e.g. first UE1, or first UE2 . . . etc); and could be before (and/or after) the UE1 and UE2 become involved in D2D communication.

Yet further, the NW could consider a sufficient large margin for this configuration (e.g. the value of the threshold), in order to assure the continuity of service from the D2D link to infrastructure link since the switch would be prepared before the D2D link is actually lost.

As regards various options for the reporting messages from the UEs, these could be sent in the same time or not; could be sent per D2D Link ID or per UE; the order could be different than represented in MSCs (e.g. first UE1, or first UE2 . . . etc).

With regard to an inter-cell embodiment eNB1 can exchange reports using X2 through messages such as REQUEST, RESPONSE and UPDATE (e.g. similar to the ones proposed by 3GPP TS 36.420, TS 36.423). During UPDATE message, we could have an update of the # of indications for each D2D Link ID.

As noted above, rather than leading to direct control, the signalling including the D2D UE Reports can be used for MDT purposes (location can be done by NW side or provided by the UE). In the case when D2D are out-of-coverage, the information can be logged and sent later.

As regards the D2D threshold values (Thr.) employed within the device-configuration messages, RSRQ Thr. can be the same or different for 2 UEs involved in D2D.

Also, and instead of D2D RSRQ Thr., the network can configure the D2D UE with other parameters such as D2D RSRP/SNR/EcNO/RSCP Thr. or other quality of link indicators such as D2D BLER/BER/PER/FER/EbNO/SINR Thr. As one of various possible alternatives, the determination of the sufficiency of the link-quality and/or the report to the NW can be any combination of the conditions above. For example, a D2D RSRQ Thr. and a BER-like Thr. In such a case the report may be sent when all conditions are met, or when only one condition is met. If required, the report can also include the type of the condition.

As noted above, in determining the sufficiency of the link-quality, it can be determined in a mobile radio communications device if a link-quality parameter value is less than, or equal to and less than, or greater than, or equal to or greater than, the said parameter reference value, and as appropriate having regard to the nature of the parameter concerned.

For example, with parameters such as RSRQ, RSRP, SNR, EcNO, RSCP, eBNO and SINR, the D2D UE can check if the measured or estimated value is lower than the said reference threshold. However, for parameters such as BLER, BER, PER and FER, the D2D UE may check if the measured or estimated value is higher than the said reference threshold.

The aforesaid relates to a determination of insufficiency.

The sufficiency of the link-quality relative to the reference value can be determined as required as being either above or below the reference value, or equal to or above, or equal to or below, the reference value. In a particularly efficient manner therefore, and responsive to the report(s) from the at least one device, the network can determine the state of the direct connection and initiate appropriate action and as based on a determination of sufficiency.

For such indication of sufficiency, it can be determined if RSRQ, RSRP, SNR, EcNO, RSCP, eBNO and SINR is/are higher than the said reference threshold. However, for parameters such as BLER, BER, PER and FER, the D2D UE may check if the measured or estimated value(s) is/are lower than the reference threshold.

If required, the report from the UE can also include the type of the determination, e.g. whether sufficient or insufficient.

These thresholds can be computed by the network for different service requirements (e.g. see standardized QCI from 3GPP TS 23.203 v11.6.0).

It should be appreciated that any combination of the parameters may be possible. For example, the time to trigger and the D2D Link ID are not necessary send in the configuration or/in the report.

Further, the network can configure a D2D UE or a D2D Link by using multiple Thr. (and using dynamic and/or static configuration) but in this case the D2D UE or the D2D Link may also report the measured parameter for which the <<Low QoL>> indication occurred.

The connectivity mode can be (at least) in UE D2D-UE D2D (or UE-UER) communication (between the 2 devices) or/and in UE-network communication (UE to/from network communication) and be either in "idle" mode or in "connected" mode.

The invention is also applicable to UER situations, and not only to D2D or P2P (Peer-to-Peer) or P2M (Peer-to-Multipeer).

There are two particular, but non-limiting, implementations for time to trigger (at UE side). First, when "time to trigger" condition is met, the indication (with or without the number of indications) is sent to the network, but not before.

Secondly, when the "time to trigger" condition is met, the buffer of indications is set to empty and starting from this moment the UE will send towards the network any indication based on an event or periodic report, after this moment. Also, and to take account of a possibly relatively long time period between consecutive indications, a "time to expire" can be included which allows, for example, the UE device to empty the buffer of indications.

Figure 18:
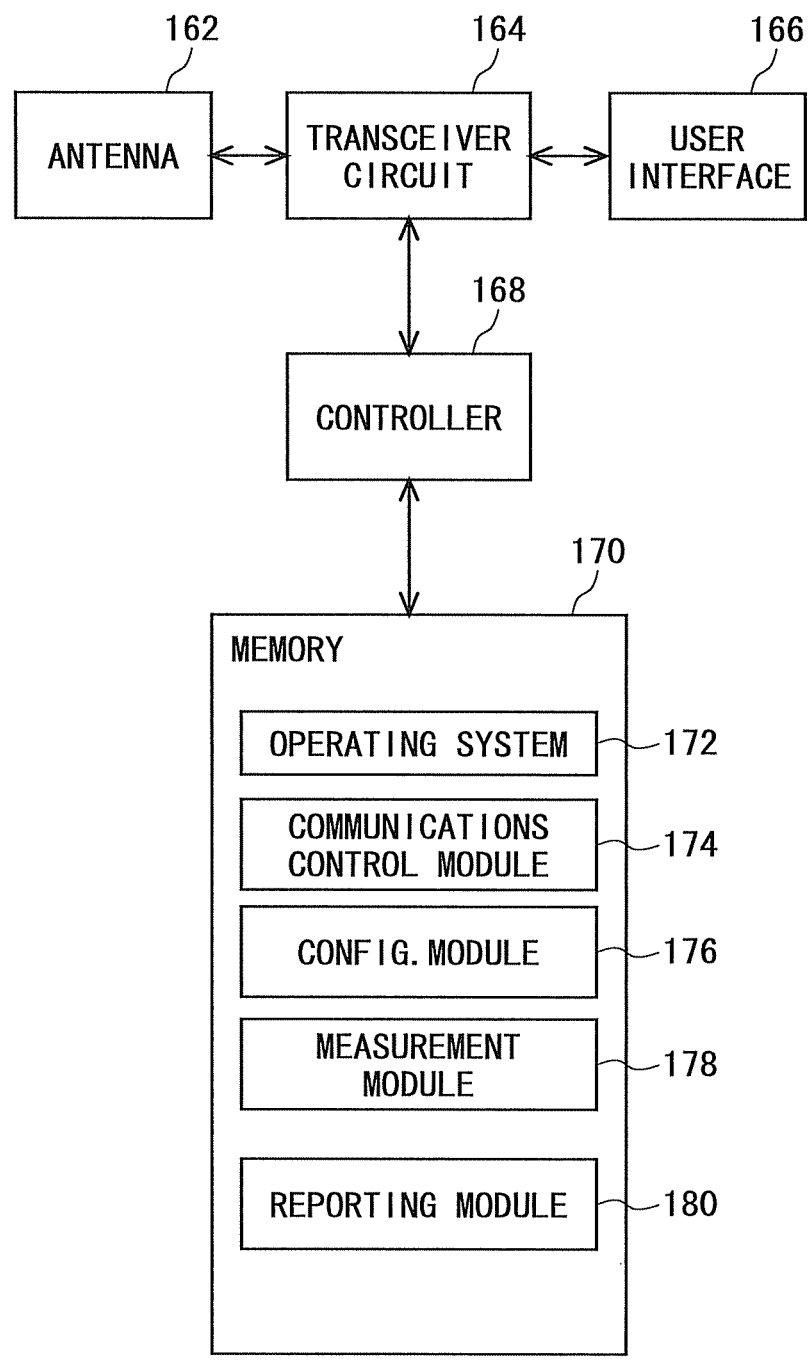
FIG. 18 is a schematic representation of a UE according to an embodiment of the invention.

Turning now to FIG. 18, there is provided a schematic view of a D2D operative UE and comprising an Antenna 162, Transceiver circuit 164, User Interface 166, Controller 168, Memory block 170 itself comprising an Operating System and Software 172, a communications control module 174 for D2D communications and UE to/from eNB communications, and which is also responsible of signalisation and of receiving configuration commands from the eNB, a configuration module 176 to configure D2D UEs upon the Configuration messages received from eNB including a reference value for low link-quality indication (such as quality threshold) and other parameters such as link ID, time to trigger, etc. and also responsible of Configuration Complete messages once the configuration is complete, a measurement module 178 to measure D2D communication quality and which may also be responsible of comparing the D2D UE quality measurement with the reference value provided by the NW, a reporting module 180 to report to eNB the Configuration Complete messages and/or the D2D low link-quality indication(s) and other parameters such as link ID and number of indications upon the configuration message received from eNB with e.g. the reference value and/or the measurement performed by D2D UE. Configuration module 176 may be also responsible of configuring the UE with legacy configurations and with other D2D configurations such as resource allocations for D2D UE and/or other commands such as "move to NetWork" commands.

In an alternative embodiment, the comparison of the D2D UE quality measurement with the reference value provided by the NW may be included in the reporting module 180.

Figure 19:
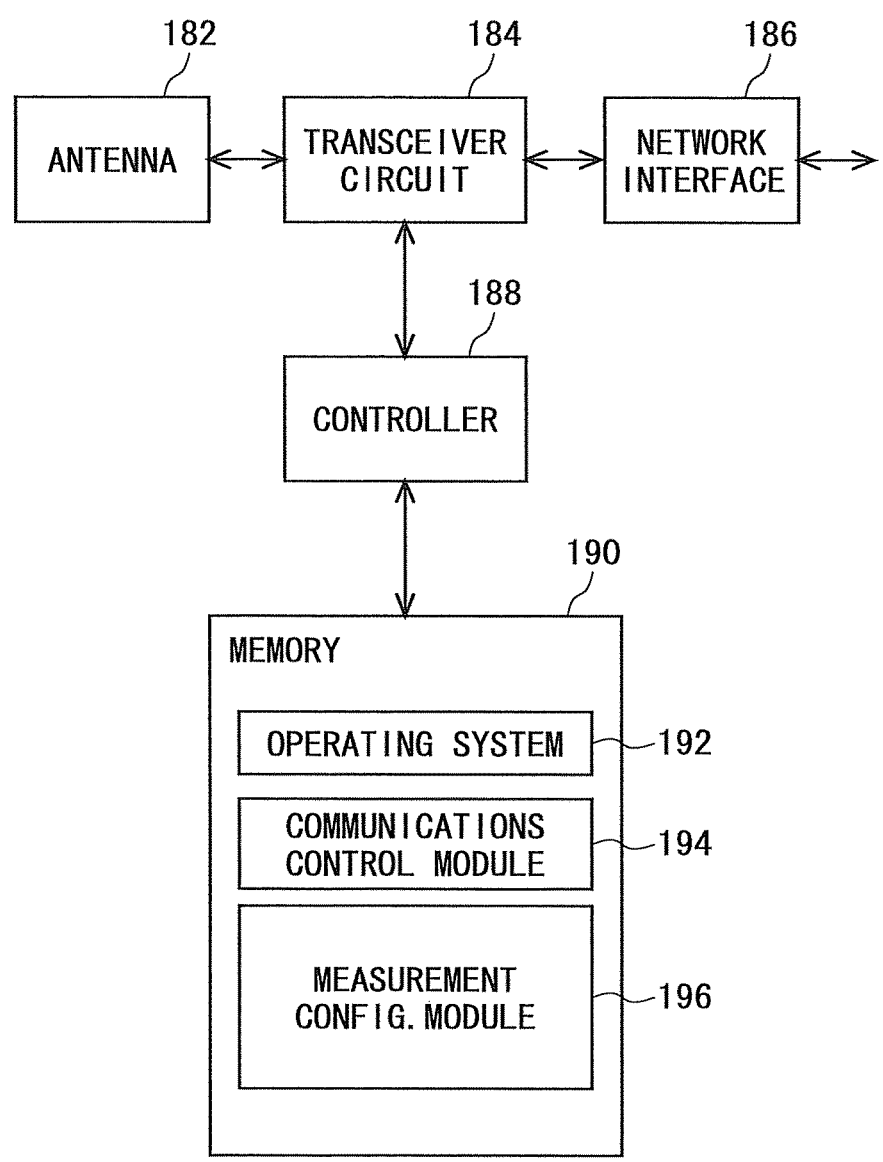
FIG. 19 is a schematic representation of a network node according to a further embodiment of the invention.

Turning lastly to FIG. 19, there is provided a schematic representation of a network node according to an embodiment of the invention such as an eNB and comprising an antenna 182, a transceiver circuit 184, network interface 186 (with other eNB or MME etc. for another alternative when MME controls), controller 188, and a memory block 190 itself comprising an Operating System and software 192, a communication control module 194 responsible for communication and signalling with UE, D2D, other eNB, NW (including D2D communication block & legacy communication block with UE or eNB . . . etc) but also responsible for controlling D2D communication and resource allocation (these functionalities or part of these functionalities may be deported in MME or other NW equipment) upon the low link-quality indication(s) from the D2D UE, a measurement configuration module 196 to send Configuration messages to D2D UE (and other UE) and to receive Configuration Complete messages from D2D UE (and other UE).

This application is based upon and claims the benefit of priority from United Kingdom Patent Application No. 1314080.1, filed on Aug. 6, 2013, the disclosure of which is incorporated herein in its entirety by reference.

REFERENCE SIGNS LIST

10 NETWORK
12 CELL
14 BASE STATION
16, 18 DEVICE
34 NETWORK
36, 38 CELL
40, 42 BASE STATION
44, 46 DEVICE
60 NETWORK
62 CELL
64 BASE STATION
66, 68 DEVICE
70 LINK

The invention claimed is:

1. A method of monitoring in a communications system in which first and second user equipments (UEs) can communicate with each other directly over a device to device (D2D) interface the method comprising:
the network indicating, to at least one of the UEs, an RRC connection reconfiguration message comprising a measurement configuration that specifies criteria for triggering of a measurement reporting event wherein the criteria includes at least one threshold value (Th) for reporting a direct link channel quality measurement and at least one hysteresis value; and
the at least one UE reporting, to the network, channel quality measurement results based on the at least one threshold value for reporting a direct link channel quality,
wherein the reporting event is triggered when a measurement result for a direct link channel quality measurement (M) falls below said threshold value (Th) to fulfil an inequality (M<Th) regardless of any hysteresis value included in the RRC connection reconfiguration message.

2. A method as claimed in claim 1 wherein the measurement configuration for a channel quality measurement comprises at least one link identifier.

3. A method as claimed in claim 1, wherein a plurality of configuration steps are performed prior to the reporting by the at least one UE.

4. A method as claimed in claim 1, wherein the report serves to indicate the channel quality for a channel from the first UE to the second UE, and/or from the second UE to the first UE.

5. A method as claimed in claim 1, and wherein the reporting comprises reporting channel quality measurement results with reference to a determined channel quality relative to the at least one threshold.

6. A method as claimed in claim 1, wherein the reporting is performed on a periodic basis.

7. A method as claimed in claim 1, wherein the reporting is triggered if specific criteria for triggering the event have occurred during a time indicated by the time-to-trigger condition.

8. A method as claimed in claim 1, wherein the at least one UE is configured to provide a predefined number of reports.

9. A method as claimed in claim 1, wherein the reporting comprises including at least one time stamp value and/or at least one localization value within a report sent to the network.

10. A method as claimed in claim 1, wherein the at least one threshold value is dynamically changed within the network, to increase the at least one threshold value or a to decrease the at least one threshold value.

11. A method as claimed in claim 1, wherein the first and second UEs comprise at least one UE-relay (UER) devices.

12. A method performed by a user equipment (UE), in a communication system in which the UE can communicate with another UE directly over a device to device (D2D) interface, the method comprising:

receiving, from network, an RRC connection reconfiguration message comprising a measurement configuration that specifies criteria for triggering of a measurement reporting event wherein the criteria includes at least one threshold value (Th) for reporting a direct link channel quality measurement and at least one hysteresis value; and reporting, to network, channel quality measurement results based on the at least one threshold value for reporting a direct link channel quality, wherein the reporting event is triggered when a measurement result for a direct link channel quality measurement (M) falls below said threshold (Th) to fulfil an inequality (M<Th) regardless of any hysteresis value included in the RRC connection reconfiguration message.

13. A method as claimed in claim 12 further comprising receiving control signaling from the network controlling subsequent communication between the UEs.

14. A method as claimed in claim 12, wherein the reporting serves to indicate the channel quality for a channel from the UE to the another UE, and/or from the another UE to the UE.

15. A method as claimed in claim 12, wherein the reporting comprises reporting channel quality measurement results with reference to a determined channel quality relative to the at least one threshold.

16. A method as claimed in claim 12, wherein the reporting is performed on a periodic basis.

17. A method as claimed in claim 12, wherein the reporting is event triggered-based on a time-to-trigger condition.

18. A method as claimed in claim 17, wherein the reporting is triggered if specific criteria for triggering the event have occurred during a time indicated by the time-to-trigger condition.

19. A user equipment (UE), for a communication system in which the UE can communicate with another UE directly over a device to device (D2D) interface, the UE comprising a controller and a transceiver, wherein the controller is operable to control the transceiver to:

receive, from a network, an RRC connection reconfiguration message comprising a measurement configuration that specifies criteria for triggering of a measurement reporting event wherein the criteria includes at least one threshold value (Th) for reporting a direct link channel quality measurement and at least one hysteresis value; and report, to network, channel quality measurement results based on the at least one threshold value for reporting a direct link channel quality, wherein the reporting event is triggered when a measurement result for a direct link channel quality measurement (M) falls below said threshold value (Th) to fulfil an inequality (Ms<Th) regardless of any hysteresis value included in the RRC connection reconfiguration message.

* * * * *